US010901605B2

(12) United States Patent
Inoue et al.

(10) Patent No.: US 10,901,605 B2
(45) Date of Patent: Jan. 26, 2021

(54) ELECTRONIC WHITEBOARD, METHOD FOR DISPLAYING DATA, AND IMAGE PROCESSING SYSTEM

(71) Applicants: Takeru Inoue, Kanagawa (JP); Yoshinaga Kato, Kanagawa (JP)

(72) Inventors: Takeru Inoue, Kanagawa (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 138 days.

(21) Appl. No.: 15/372,535

(22) Filed: Dec. 8, 2016

(65) Prior Publication Data

US 2017/0177190 A1     Jun. 22, 2017

(30) Foreign Application Priority Data

Dec. 18, 2015   (JP) ................................ 2015-248046

(51) Int. Cl.
*H04L 12/18* (2006.01)
*G06F 3/0488* (2013.01)
(Continued)

(52) U.S. Cl.
CPC ............ *G06F 3/0488* (2013.01); *G06F 21/34* (2013.01); *H04L 12/1822* (2013.01);
(Continued)

(58) Field of Classification Search
CPC ...... G06F 3/0488; G06F 21/34; G06F 3/0482; G06F 3/04842; G06F 1/1616;
(Continued)

(56) References Cited

U.S. PATENT DOCUMENTS 6,763,373 B2 *   7/2004  Shiigi ................. G06Q 10/107
                                                    709/206
9,185,344 B2    11/2015  Inoue
(Continued)

FOREIGN PATENT DOCUMENTS

JP      2003-229987       8/2003
JP      2006-135671       5/2006
(Continued)

OTHER PUBLICATIONS

Japanese Office Action for 2015-248046 dated Oct. 8, 2019.

*Primary Examiner* — Di Xiao
(74) *Attorney, Agent, or Firm* — IPUSA, PLLC

(57) ABSTRACT

An electronic whiteboard to display visual information including handwritten data superimposed with a display image, includes a unit to authenticate a user; a unit to obtain user identification information for identifying the user in case where authentication of the user has succeeded; a unit to store the visual information associated with the user identification information; a unit to read the visual information associated with the user identification information; a unit to display the visual information; a unit to set a mail address of the electronic whiteboard as a transmission source, and to transmit the visual information to a specified destination by an e-mail; a unit to store the mail address of the user associated with the user identification information; and a unit to replace the transmission source by using the specified mail address of the user if the authentication of the user has succeeded.

12 Claims, 26 Drawing Sheets

(51) Int. Cl.
*G06F 21/34* (2013.01)
*H04L 12/58* (2006.01)
*H04L 29/12* (2006.01)

(52) U.S. Cl.
CPC .............. *H04L 51/28* (2013.01); *H04L 61/20* (2013.01); *H04L 61/1594* (2013.01)

(58) Field of Classification Search
CPC .... G06F 1/1618; G06F 1/1641; G06F 1/1652; G06F 1/1677; G06F 1/1679; G06F 3/1423; G06F 21/6218; G06F 2221/2149; G06F 3/0604; G06F 3/065; G06F 3/0673; G06F 16/00; G06F 16/13; G06F 16/182; G06F 16/24; G06F 16/338; G06F 16/358; G06F 16/433; G06F 16/487; G06F 16/489; G06F 16/634; G06F 16/685; G06F 16/9038; G06F 16/951; G06F 16/9535; G06F 16/954; G06F 19/00; G06F 1/163; G06F 21/32; G06F 3/011; G06F 3/03545; G06F 3/03547; G06F 3/0421; G06F 3/0425; G06F 3/0481; G06F 3/04817; G06F 3/0486; G06F 3/04883; G06F 3/147; G06F 40/106; G06F 40/12; G06F 40/134; G06F 40/169; G06F 40/58; G06F 8/38; G06F 9/451; G06F 9/5038; H04L 12/1822
See application file for complete search history.

(56) References Cited

U.S. PATENT DOCUMENTS

| 2006/0151607 | A1 | 7/2006 | Horikiri et al. |
| 2007/0046775 | A1* | 3/2007 | Ferren .................... H04N 7/142 348/14.08 |
| 2010/0238500 | A1 | 9/2010 | Teramoto et al. |
| 2011/0004755 | A1 | 1/2011 | Ueno |
| 2012/0229425 | A1* | 9/2012 | Barrus ................. G06F 3/04883 345/179 |
| 2012/0317222 | A1* | 12/2012 | Almeida ................. H04L 51/28 709/206 |
| 2013/0110340 | A1* | 5/2013 | Park ........................ B60L 53/18 701/22 |
| 2013/0198653 | A1* | 8/2013 | Tse ......................... G06F 3/0484 715/751 |
| 2013/0290416 | A1* | 10/2013 | Nelson ................... G06Q 10/10 709/204 |
| 2014/0137193 | A1 | 5/2014 | Inoue |
| 2015/0046581 | A1 | 2/2015 | Inoue |
| 2015/0249696 | A1* | 9/2015 | Nagase ................. H04L 65/403 709/203 |

FOREIGN PATENT DOCUMENTS

| JP | 2007-060643 | 3/2007 |
| JP | 2010-220119 | 9/2010 |
| JP | 2011-13956 | 1/2011 |
| JP | 2013-150131 | 8/2013 |
| JP | 2014-109827 | 6/2014 |

* cited by examiner

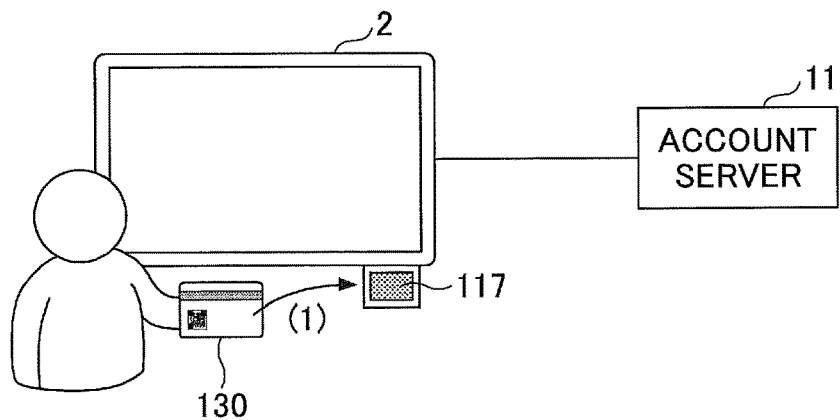
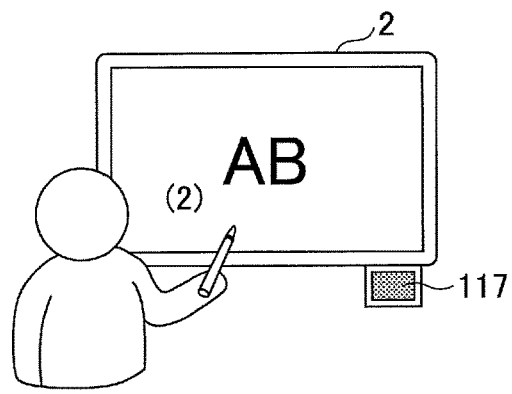
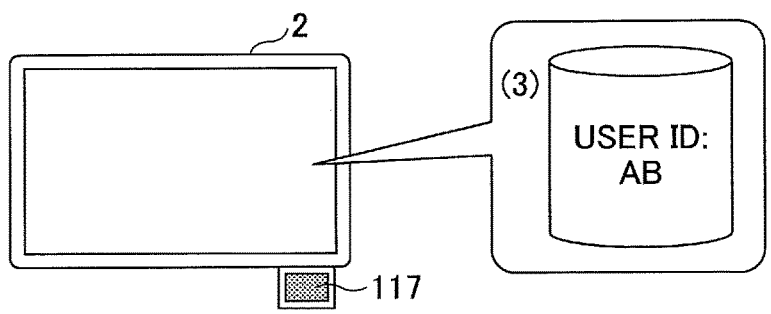
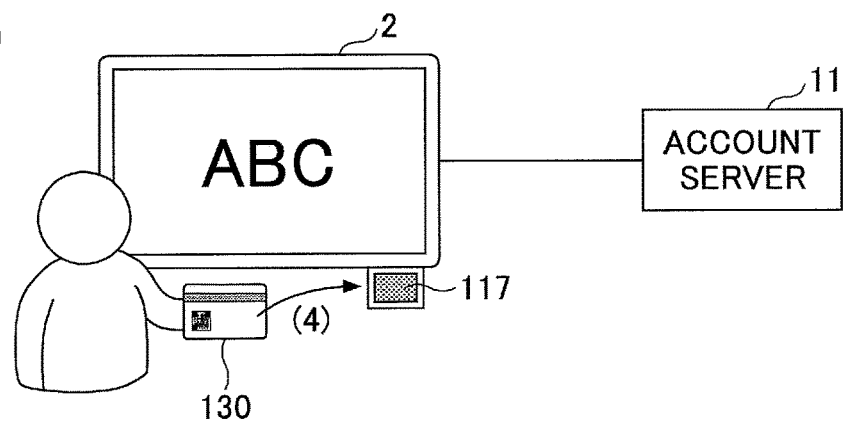

FIG.6
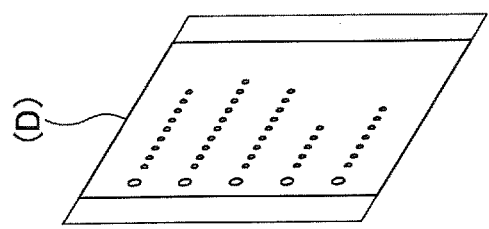
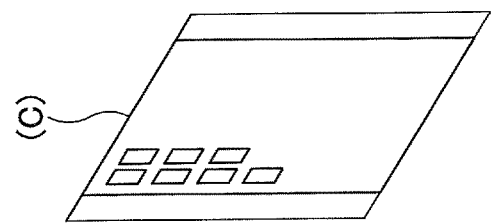
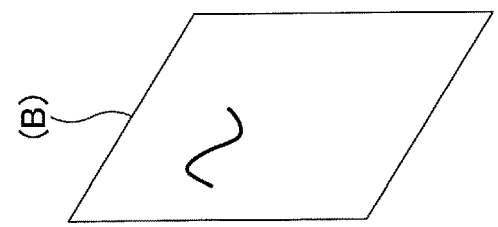
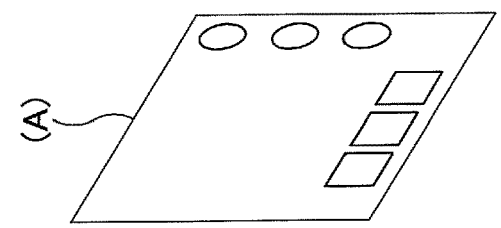
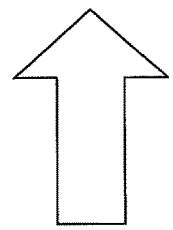
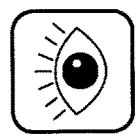

FIG.22A

| Mail sender (Mail from) | Subject | Date |
|---|---|---|
| nama1@mail.com | Page contents of IWB:iwb-xxxxxxxx-xxxxxx.pdf | xxxxxxxxx |

FIG.22B

| Mail sender (Mail from) | Subject | Date |
|---|---|---|
| iwb1@mail.com | Page contents of IWB:iwb-xxxxxxxx-xxxxxx.pdf | xxxxxxxxx |

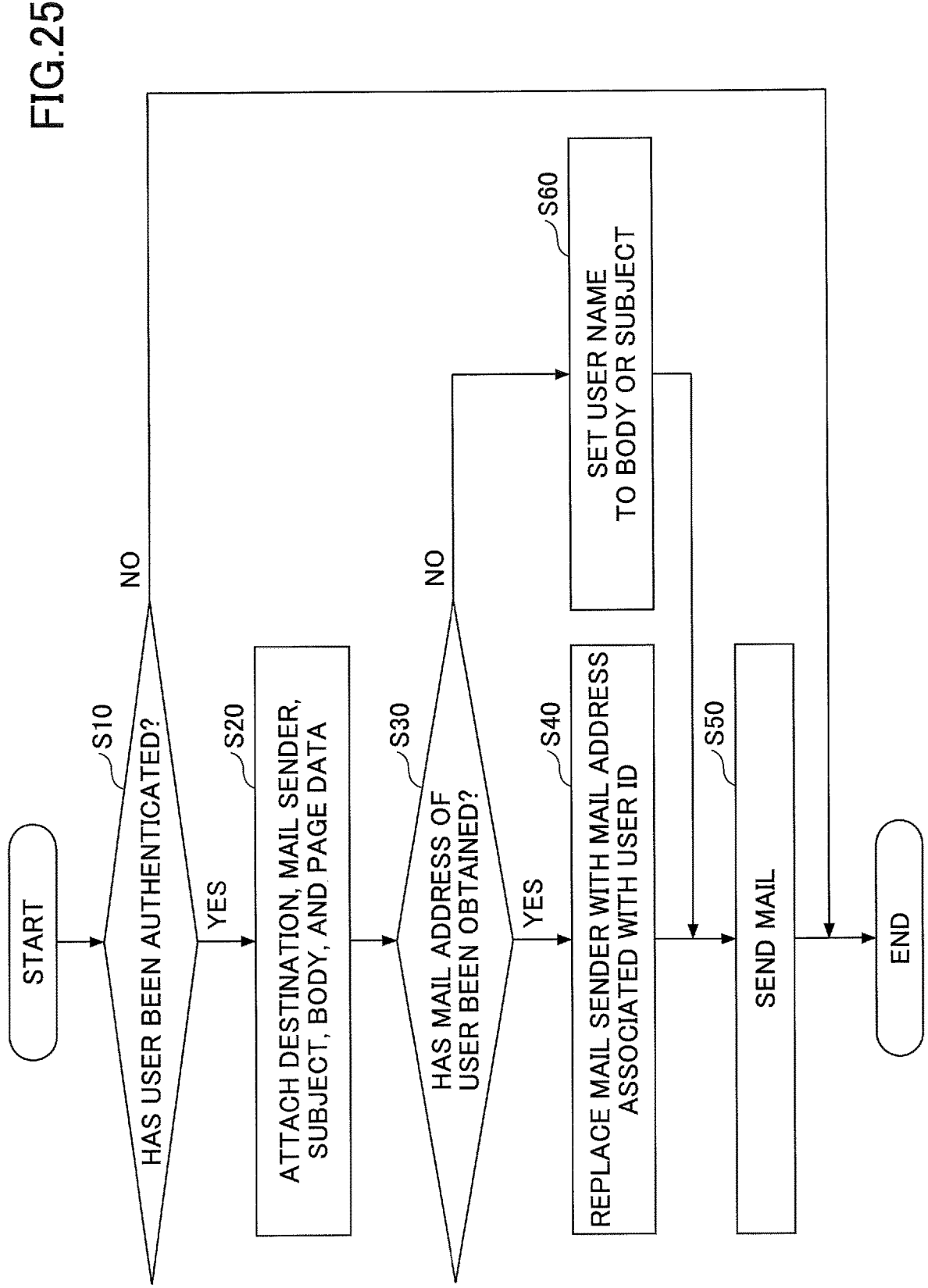

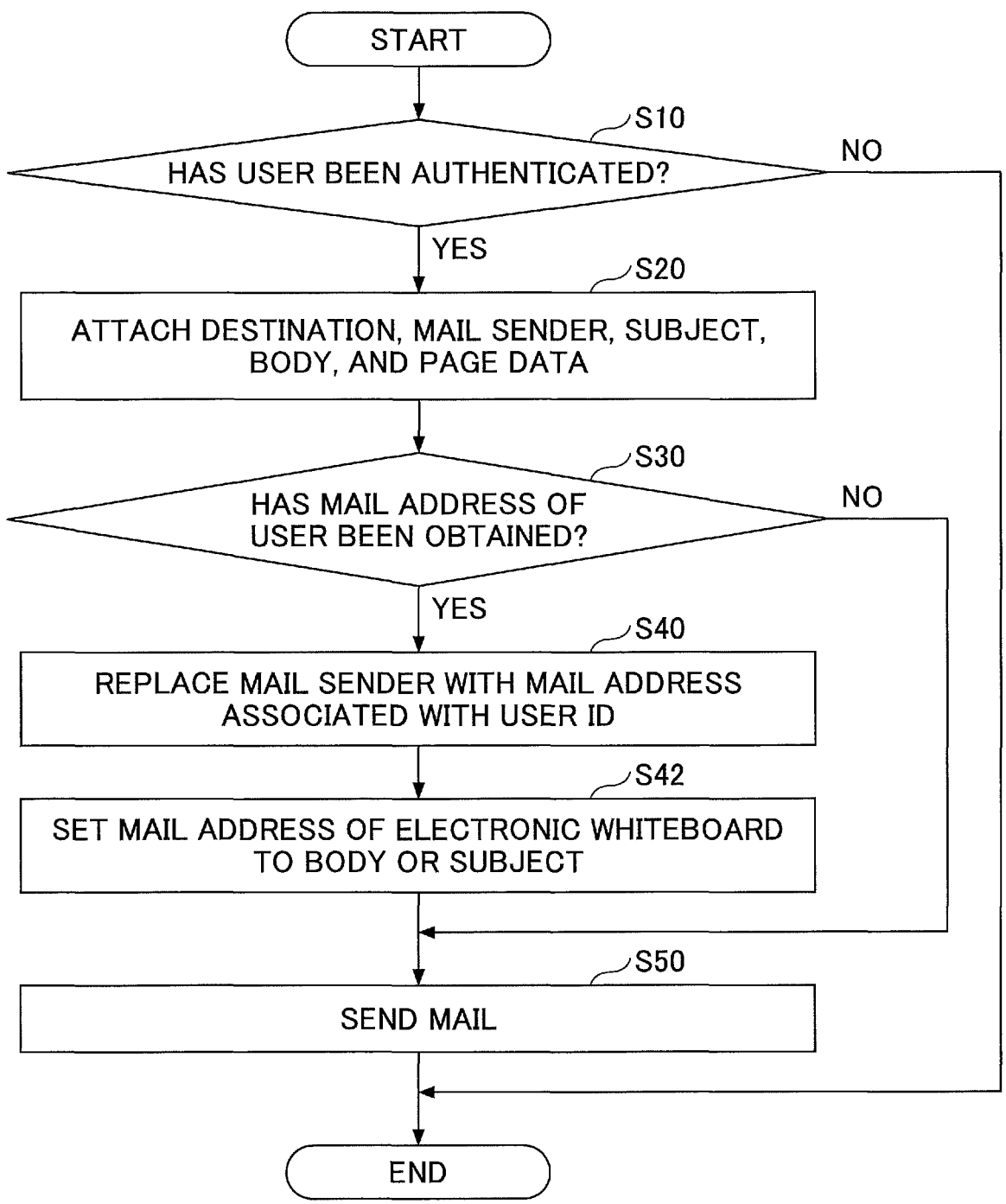

FIG.27A

| Mail sender (Mail from) | Subject | Date |
|---|---|---|
| iwb1@mail.com | nama1 | xxxxxxxxx |

FIG.27B

| Mail sender (Mail from) | Subject | Date |
|---|---|---|
| User1@mail.com | iwb1@mail.com | xxxxxxxxx |

FIG.28

| STROKE DATA ID | START TIME | FINISH TIME | COLOR | WIDTH | COORDINATE ARRAY DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ⋮ | ⋮ | ⋮ | ⋮ | ⋮ | ⋮ | st001, st002, st003

FIG.29

| X COORDINATE | Y COORDINATE | TIME DIFFERENCE | PEN PRESSURE |
|---|---|---|---|
| 10 | 10 | 100 | 255 |
| 12 | 10 | 200 | 255 |
| 14 | 12 | 300 | 255 |
| ⋮ | ⋮ | ⋮ | ⋮ | c001, c002, c003

ELECTRONIC WHITEBOARD, METHOD FOR DISPLAYING DATA, AND IMAGE PROCESSING SYSTEM

BACKGROUND OF THE INVENTION

1. Field of the Invention

The present disclosure relates to an electronic whiteboard, a method for displaying data, and an image processing system.

2. Description of the Related Art

Electronic whiteboards have been known that have touch panels installed on large flat panel displays. An electronic whiteboard displays a screen having a role of a whiteboard or a blackboard on the flat panel display, takes in a trajectory of an electronic pen or a finger via a touch panel, and draws the trajectory on the screen as handwritten data (which will be referred to as "visual information", below). Therefore, the user can use the screen as a whiteboard or a blackboard. Also, an electronic whiteboard that can be connected with a PC (Personal Computer) can display the same screen on the flat panel display as displayed on the PC so as to superimpose and draw the visual information with the displayed image, and can operate on the PC based on information input through the touch panel on the electronic whiteboard.

In many cases, such an electronic whiteboard has been used in a circumstance where a large number of people gather, such as a conference. Therefore, conventionally, there has been not much need for a function to authenticate a user. In other words, personal information has been less likely to be accumulated in an electronic whiteboard compared to a PC being used by unspecified users, and hence, convenience that the electronic whiteboard can be used without authentication has been prioritized over a requirement for identifying the user. However, as electronic whiteboards have become much used in a state connected to a network, the need increases for determining whether a user has permission to access a resource on the network by using an authentication function of an electronic whiteboard.

As such devices other than electronic whiteboards that are used by unspecified users, image forming apparatuses such as printers have been known. Also, it has been known that some conventional image forming apparatuses have authentication functions to authenticate users (see, for example, Patent Document 1). Patent Document 1 discloses an image forming apparatus on which settings for a user whose login request has been accepted are automatically reflected.

However, there has been a problem with a device used by unspecified users, including an image forming apparatus, in that associating data generated by a user with the user is not take into consideration. When using an electronic whiteboard, it is often the case that data displayed by a user in a previous conference is used again in the next conference. Therefore, it has been conventionally possible to store visual information and the like written on the electronic whiteboard by a user, along with a number discretionally assigned by the user to the visual information. However, since another user may assign the same number for his/her visual information as the number once used, if the user inputs the number into the electronic whiteboard to reproduce the visual information, an inconvenient situation may arise in that the visual information having the same number assigned by the other user is also displayed. Also, in an aspect, it is bothersome for the user to remember the number.

Further, electronic whiteboards in these days have a mail sending function with which a user can transmit visual information displayed by the user as minutes of a conference, by an e-mail to a transmission destination specified by the user. In this case, since the electronic whiteboard transmits the e-mail, the mail address of the electronic whiteboard is set as the mail address of the transmission source of the e-mail. Therefore, a recipient who received the e-mail can determine that it is an e-mail from the electronic whiteboard, but may not be able to determine a specific person who has transmitted the e-mail. Therefore, other inconvenient situations may arise in that the recipient who received the e-mail cannot identify the user who has transmitted the e-mail, and cannot identify a person to talk to about the visual information attached to the e-mail.

SUMMARY OF THE INVENTION

According to an embodiment, an electronic whiteboard configured to display visual information including handwritten data superimposed with a display image, includes an authentication unit configured to authenticate a user; an identification information obtainment unit configured to obtain user identification information for identifying the user in case where authentication of the user by the authentication unit has succeeded; a visual information storage unit configured to store the visual information associated with the user identification information; a read unit configured to read the visual information associated with the user identification information obtained by the identification information obtainment unit, from the visual information storage unit; a display unit configured to display the visual information read by the read unit; an e-mail transmitter unit configured to set a mail address of the electronic whiteboard as a transmission source, and to transmit the visual information to a destination specified by the user by an e-mail; a mail address storage unit configured to store the mail address of the user associated with the user identification information; and a mail setting unit configured, in the case where the authentication of the user has succeeded, to replace the transmission source by using the mail address of the user stored in the mail address storage unit based on the user identification information.

BRIEF DESCRIPTION OF DRAWINGS

FIGS. 1A-1D are examples of diagrams schematically illustrating a method for managing data by an electronic whiteboard according to an embodiment;

FIG. 6 is an example of a configuration diagram of image layers;

FIGS. 22A-22B are examples of diagrams illustrating transmission sources of an e-mail displayed on a user PC of a recipient of the e-mail;

FIG. 25 is an example of a flowchart that illustrates steps for replacing the mail address of a transmission source of an e-mail by an electronic whiteboard (modified example 2);

FIG. 26 is an example of a flowchart that illustrates steps for replacing the mail address of a transmission source of an e-mail by an electronic whiteboard (modified example 3);

FIGS. 27A-27B are examples of diagrams illustrating e-mails having respective mail addresses of a user name and an electronic whiteboard set in the subject field;

FIG. 28 is a table schematically illustrating stroke array data; and

FIG. 29 is a table schematically illustrating coordinate array data.

DETAILED DESCRIPTION OF THE EMBODIMENTS

Figure 2:
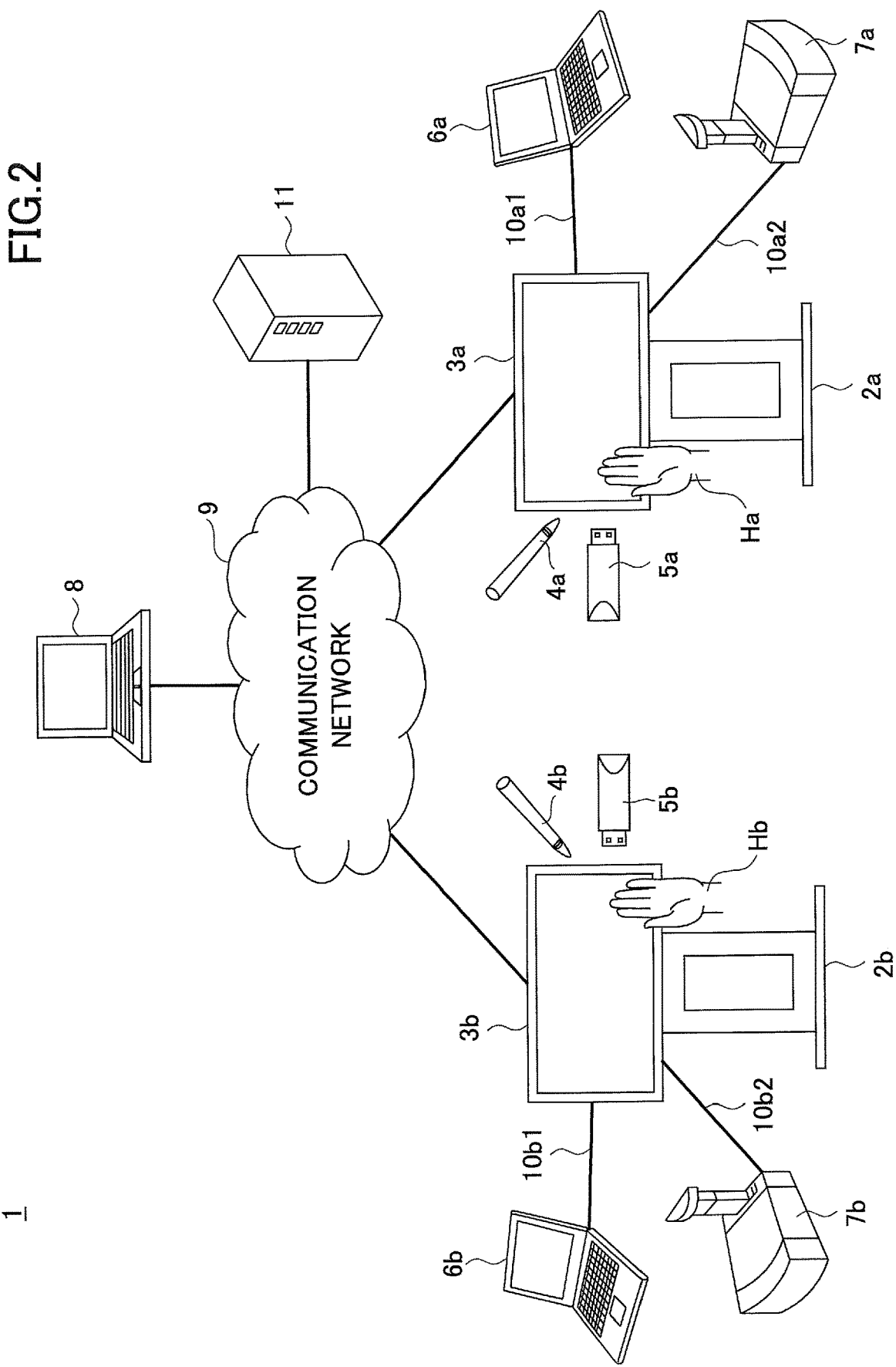
FIG. 2 is an example of a configuration diagram of an entire image processing system according to an embodiment.

In the following, embodiments will be described with reference to the drawings. According to an embodiment, it is possible to provide an electronic whiteboard with which a user can display visual information associated with the user, and the transmission source of an e-mail containing the visual information can be determined by a recipient.

An electronic whiteboard in the embodiment associates data handwritten by a user on the electronic whiteboard (referred to as a "stroke image" in the embodiments below) with the user ID of the user, along with an output image from a note PC 6 or the like, and stores the associated data. Note that the stroke image and the output image are collectively referred to as the "page data". Thus, the user can redisplay the page data to be used continuously, and can add or correct the content. For example, even if a conclusive result is not yet obtained in a conference even at the end time of the conference, the page data can be redisplayed on the electronic whiteboard in the next conference, and the user can add and correct the page data once the conference is resumed. Other than a conference, if the electronic whiteboard is used, for example, in a class at school, the teacher can redisplay the page data in the next class on the same subject, and can add and correct the page data. To realize such as a method of use, the electronic whiteboard in the embodiment associates the page data with the user as follows.

FIGS. 1A-1D are examples of diagrams schematically illustrating a method for managing data by an electronic whiteboard 2 according to the embodiment.

The electronic whiteboard 2 in the embodiment includes an RF tag reader 117. The electronic whiteboard 2 is connected with an account server 11 via a network.

(1) The user carrying an IC card 130 holds the card over the RF tag reader 117 included in the electronic whiteboard 2 (FIG. 1A). Thus, the account server 11 authenticates the user, and the electronic whiteboard 2 can obtain at least the user ID of the user.

(2) The user handwrites page data on the electronic whiteboard 2 (FIG. 1B). In FIG. 1, characters "AB" are handwritten.

(3) The user can log out from the electronic whiteboard 2 any time, and when the user logs out or the power is turned off, the electronic whiteboard 2 associates the page data with the user ID, and holds the associated data (FIG. 1C).

(4) At the next use, when the user holds the IC card 130 over the RF tag reader 117, the electronic whiteboard 2 authenticates the user as in the above (1), and obtains the user ID from the IC card 130. Therefore, the page data associated with the user ID held in the electronic whiteboard 2 can be read from the electronic whiteboard 2, to be displayed on the display (FIG. 1D). Subsequently, the user can add or correct characters and the like along with "AB" displayed on the display of the electronic whiteboard 2.

Although the electronic whiteboard 2 is supposed to be used by a large number of unspecified people, the electronic whiteboard 2 in the embodiment authenticates a user, and uses the authentication result to associate the page data with the user, including a stroke image generated by the user. When the next authentication succeeds, the page data generated by the user is redisplayed on the display, and hence, the work suspended in the previous session can be resumed.

About Terms

The visual information refers to information that can be visually recognized by a person. The information may not have a meaning, but in many cases, the information refers to that is useful for the user such as characters and figures. As an example of the visual information, stroke images will be described in the embodiment. As described above, when a stroke image is associated with the user ID to be stored, the stroke image and an output image (C), which will be described later, are put together and stored, the put-together data is referred to as the page data. Therefore, in the embodiment, application examples will be described in which page data is associated with a user ID and stored.

"Authentication of a user" means that the user is confirmed by an electronic whiteboard 2 and the like that the user has permission to use the electronic whiteboard 2. If confirmed, it is referred to as "the authentication has succeeded", otherwise, "the authentication has failed". Once the authentication has succeeded, the user can log in the electronic whiteboard 2. Therefore, from the user's point of view, authentication can be regarded as a login on the electronic whiteboard 2, or performing a login operation.

"Association" means that a user and page data being associated with each other in a state such that if one of the users and the page data is identified, the other can be identified.

"User identification information" is identification information for uniquely identifying a user by the electronic whiteboard 2, specifically, a non-duplicated number, a combination of a department name and a number, a full name, a mail address, a telephone number, or the like, but not limited to these. Also, the "identification information" refers to a name, a code, a string, a numerical value, or a combination of these that is used for uniquely distinguishing a specific object among multiple objects. It is the same for identification information described in the following.

<System Overview>

FIG. 2 is a configuration diagram of an entire image processing system 1 according to the embodiment. Note that in FIG. 2, just two units of the electronic whiteboards 2*a* and 2*b*, accompanying electronic pens 4*a* and 4*b*, and the like are illustrated to simplify the description. However, three or more units of the electronic whiteboards 2, the electronic pens, and the like may be used. As illustrated in FIG. 2, the image processing system 1 includes multiple electronic whiteboards 2*a* and 2*b*, multiple electronic pens 4*a* and 4*b*, USB memories 5*a* and 5*b*, note PCs 6*a* and 6*b*, video-conference terminals 7*a* and 7*b*, the account server 11, and a PC 8. Also, the electronic whiteboards 2*a* and 2*b*, and the PC 8 are connected to be capable of communicating with each other via a communication network 9. Further, the multiple electronic whiteboards 2*a* and 2*b* include displays 3*a* and 3*b*, respectively.

First, the account server 11 is an information processing apparatus to authenticate a user of the electronic whiteboard 2. The account server 11 has card information about IC cards carried by respective users, and determines whether a card information item equivalent to a card information item of an IC card read by the RF tag reader 117 of the electronic whiteboard 2, is registered in the account server 11. If the card information item is registered, the account server 11 determines that the authentication of the user has succeeded, otherwise, determines that the authentication has failed. Note that the account server 11 may not use the IC card, but may authenticate a user by the user name and the password or the like.

Also, the electronic whiteboard 2*a* can have the display 3*a* display an image drawn by events generated by the electronic pen 4*a* (touches on the display 3*a* by the pen point of the electronic pen 4*a* or the pen tail of the electronic pen 4*a*). Note that the image displayed on the display 3*a* can be changed based on events generated by not only the electronic pen 4*a*, but also a user's hand Ha or the like (gestures for magnification, reduction, page turning, and the like). Upon such an event, positional information designated by the electronic pen 4*a* or the hand Ha is input into the electronic whiteboard 2*a*.

Also, the USB memory 5*a* can be connected with the electronic whiteboard 2*a* so that the electronic whiteboard 2*a* can read an electronic file such as a PDF (Portable Document Format) file from the USB memory 5*a*, and the electronic whiteboard 2*a* can record an electronic file on the USB memory 5*a*. Also, a note PC 6*a* is connected with the electronic whiteboard 2*a* via a cable 10*a*1 that is capable of communication by standards such as Display Port (trademark), DVI (Digital Visual Interface), HDMI (High-Definition Multimedia Interface, trademark), VGA (Video Graphics Array), etc. Then, when an event is generated by a contact on the display 3*a*, the electronic whiteboard 2*a* can transmit event information representing the event to the note PC 6*a* in the same way as done for events on an input unit such as a mouse and a keyboard. Similarly, the video-conference terminal 7*a* is connected with the electronic whiteboard 2*a* via a cable 10*a*2 that is capable of communication by the standards. Note that the note PC 6*a* and the video-conference terminal 7*a* may communicate with the electronic whiteboard 2*a* via wireless communication compliant with various wireless communication protocols such as Bluetooth (trademark).

At another site where the electronic whiteboard 2*b* is installed, the electronic whiteboard 2*b* having the display 3*b*, the electronic pen 4*b*, the USB memory 5*b*, the note PC 6*b*, the video-conference terminal 7*b*, a cable 10*b*1, and a cable 10*b*2 are used similarly as above. In addition, an image displayed on the display 3*b* can be changed based on events generated by a user's hand Hb or the like.

Thus, an image drawn on the display 3*a* of the electronic whiteboard 2*a* at the one site is displayed on the display 3*b* of the electronic whiteboard 2*b* at the other site. Conversely, an image drawn on the display 3*b* of the electronic whiteboard 2*b* at the other site is displayed on the display 3*a* of the electronic whiteboard 2*a* at the one site. In this way, a remote sharing process for sharing the same image at remote locations can be executed with the image processing system 1. Therefore, by using the system, for example, a conference between remote locations can be held very conveniently.

Note that in the following, an arbitrary one of the electronic whiteboards will be referred to as an "electronic whiteboard 2". An arbitrary one of the displays will be referred to as a "display 3". An arbitrary one of the electronic pens will be referred to as an "electronic pen 4". An arbitrary one of the USB memories will be referred to as a "USB memory 5". An arbitrary one of the note PCs will be referred to as a "note PC 6". An arbitrary one of the video-conference terminals will be referred to as a "video-conference terminal 7". Also, an arbitrary one of the hands of users will be referred to as a "hand H". An arbitrary one of the cables will be referred to as a "cable 10".

Also, although an electronic whiteboard will be described in the embodiment as an example of an image processing apparatus, the image processing apparatus is not limited to that; other examples of the image processing apparatus include an electronic signboard (a digital signage), a telestrator used for sports and weather forecast, and a remote image (video) diagnostic device. Also, although the note PC 6 will be described as an example of an information processing terminal, the information processing terminal is not limited to that; other examples of the information processing terminal include a desktop PC, a tablet PC, a PDA, a digital video camera, a digital camera, a game machine, and any other terminals with which an image frame can be provided. Further, the communication network includes the Internet, a LAN (Local Area Network), and a cellular phone communication network. Also, although the USB memory 5 will be described as an example of a recording medium, the recording medium is not limited to that; other examples of the recording medium include an SD card and various recording media.

<Hardware Configuration of Electronic Whiteboard>

Next, by using FIG. 3, a hardware configuration of the electronic whiteboard 2 in the embodiment will be described. Note that FIG. 3 is a hardware configuration diagram of the electronic whiteboard 2.

Figure 3:
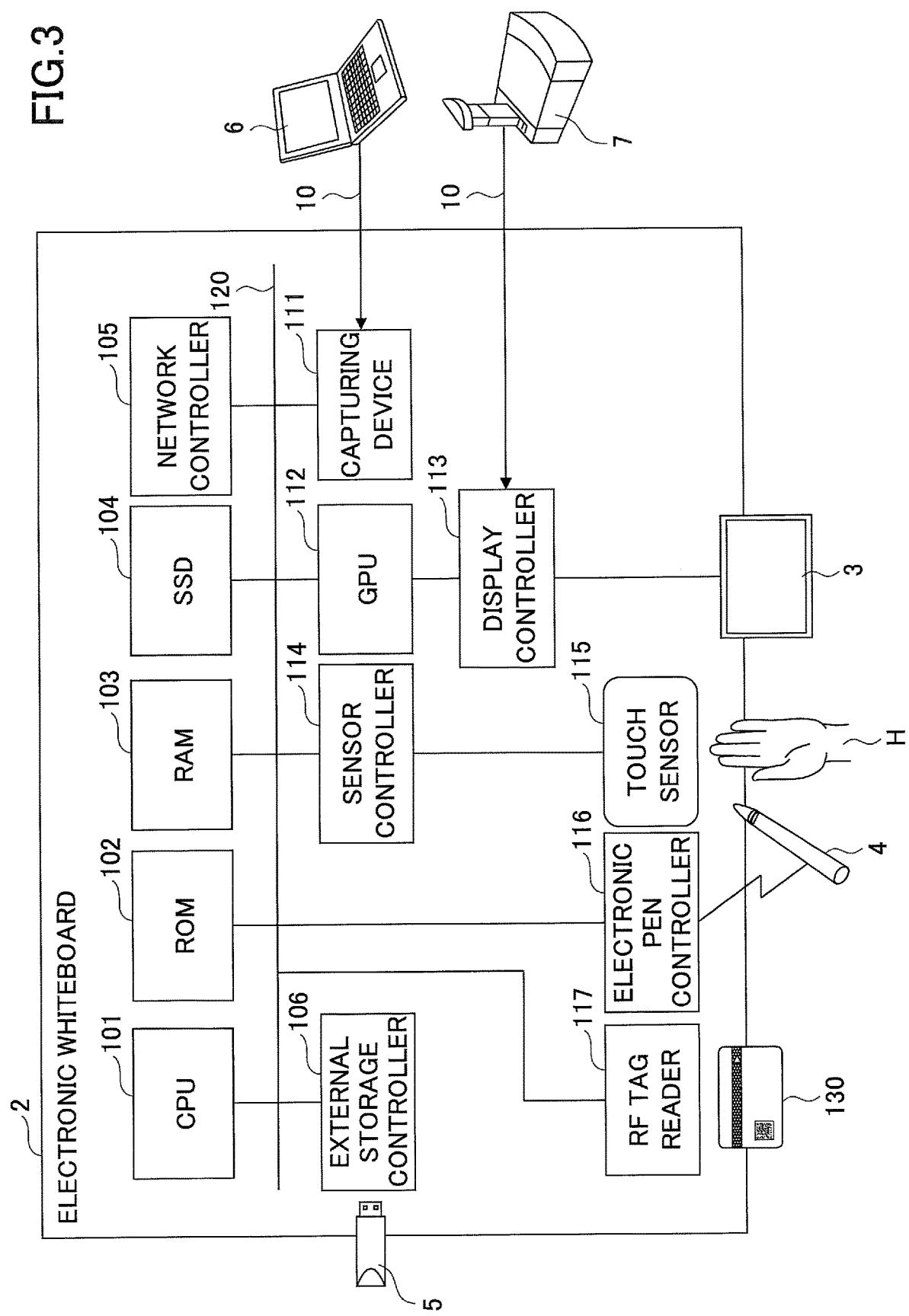
FIG. 3 is an example of a hardware configuration diagram of an electronic whiteboard.

As illustrated in FIG. 3, the electronic whiteboard 2 includes a CPU (Central Processing Unit) 101 to control the overall behavior of the electronic whiteboard 2; a ROM (Read-Only Memory) 102 to store programs to be used for driving the CPU 101, such as an IPL (Initial Program Loader); a RAM (Random Access Memory) 103 used as a work area for the CPU 101; an SSD (Solid State Drive) 104 to store various data items of a program for the electronic whiteboard 2 and the like; a network controller 105 to control communication with the communication network 9; and an external storage controller 106 to control communication with the USB memory 5.

The electronic whiteboard 2 also includes a capturing device 111 for displaying a still picture or a moving picture on a display of the note PC 6; a GPU (Graphics Processing Unit) 112 dedicated to processing graphics; and a display controller 113 to control and manage a screen display to output an image output from the GPU 112 to the display 3 and the video-conference terminal 7.

The electronic whiteboard 2 further includes a sensor controller 114 to control a process of a touch sensor 115; and the touch sensor 115 to detect a contact of the electronic pen 4 or the user's hand H on the display 3. This touch sensor 115 receives coordinates as input by an infrared cut-off method, and detects the coordinates (namely, positional information). This method of inputting coordinates and detecting coordinates is a method in which two light reception/emission devices disposed at both ends on the upper side of the display 3, emit multiple infrared rays parallel to the display 3, and receive the light that is reflected by a reflecting member disposed around the display 3, and comes back through the same light path as the light emitted by light reception elements has gone through. The touch sensor 115 outputs IDs (Identifications) of the infrared rays that have been emitted by the two light reception/emission devices, and cut off by an object, to the sensor controller 114, and the sensor controller 114 identifies a coordinate position which is a contact position of the object. Note that all IDs described in the following are examples of identification information.

The touch sensor 115 is not limited to such an infrared cut-off method, but various detection units may be used including a touch panel of an electrostatic capacitance type that identifies a contact position by detecting a change of the electrostatic capacitance; a touch panel of a resistance film method to identify a contact position by a voltage change of two resistor films facing each other; and a touch panel of an electromagnetic induction type to identify a contact position by detecting electromagnetic induction generated by a contact object contacting a display unit.

The electronic whiteboard 2 also includes an electronic pen controller 116. This electronic pen controller 116 communicates with the electronic pen 4, to determine whether there is a touch by the pen point or a touch by the pen tail on the display 3. Note that the electronic pen controller 116 may determine whether there is a touch not only by the pen point or the pen tail, but also by a part of the electronic pen 4 gripped by the user, or another part of the electronic pen.

The electronic whiteboard 2 also includes the RF tag reader 117. The RF tag reader 117 reads card information specific to the IC card 130 from an RF tag embedded in the IC card 130 by wireless communication. The RF tag reader 117 may be installed in the electronic whiteboard 2, or may be attached to the electronic whiteboard 2 externally. In this case, the RF tag reader 117 is connected with, for example, the external storage controller 106, or may be connected with the network controller 105, or may be connected wirelessly. Also, the IC card 130 may be installed in a smart device such as a smart phone.

The RF tag reader 117 is used for authenticating a user by the electronic whiteboard 2. Therefore, the electronic whiteboard 2 may include an identification device to identify a user, instead of the RF tag reader 117 or together with the RF tag reader 117. As such identification devices, biological object authentication devices (for fingerprint, palm print, iris, face, etc.) have been known.

The electronic whiteboard 2 may authenticate a user without using the RF tag reader 117. For example, if a user is authenticated by a combination of the password and the user name (may be the user ID), the RF tag reader 117 may be omitted. In this case, the user inputs the password and the user name on the touch panel.

Also, as alternative information of the card information, the user may have the electronic whiteboard 2 read a bar code or a two-dimensional bar code displayed on a smart device such as a smart phone, or inputs the password and the user name on the smart device. In this case, the electronic whiteboard 2 reads the bar code or the like by a camera.

The electronic whiteboard 2 further includes a bus Line 120 including an address bus, a data bus, and the like to electrically connect the CPU 101, the ROM 102, the RAM 103, the SSD 104, the network controller 105, the external storage controller 106, the capturing device 111, the GPU 112, the sensor controller 114, and the electronic pen controller 116 as illustrated in FIG. 2.

Note that the program for the electronic whiteboard 2 may be recorded on recording media readable by computers such as CD-ROMs to be distributed.

<Functional Configuration of Electronic Whiteboard>

Figure 4:
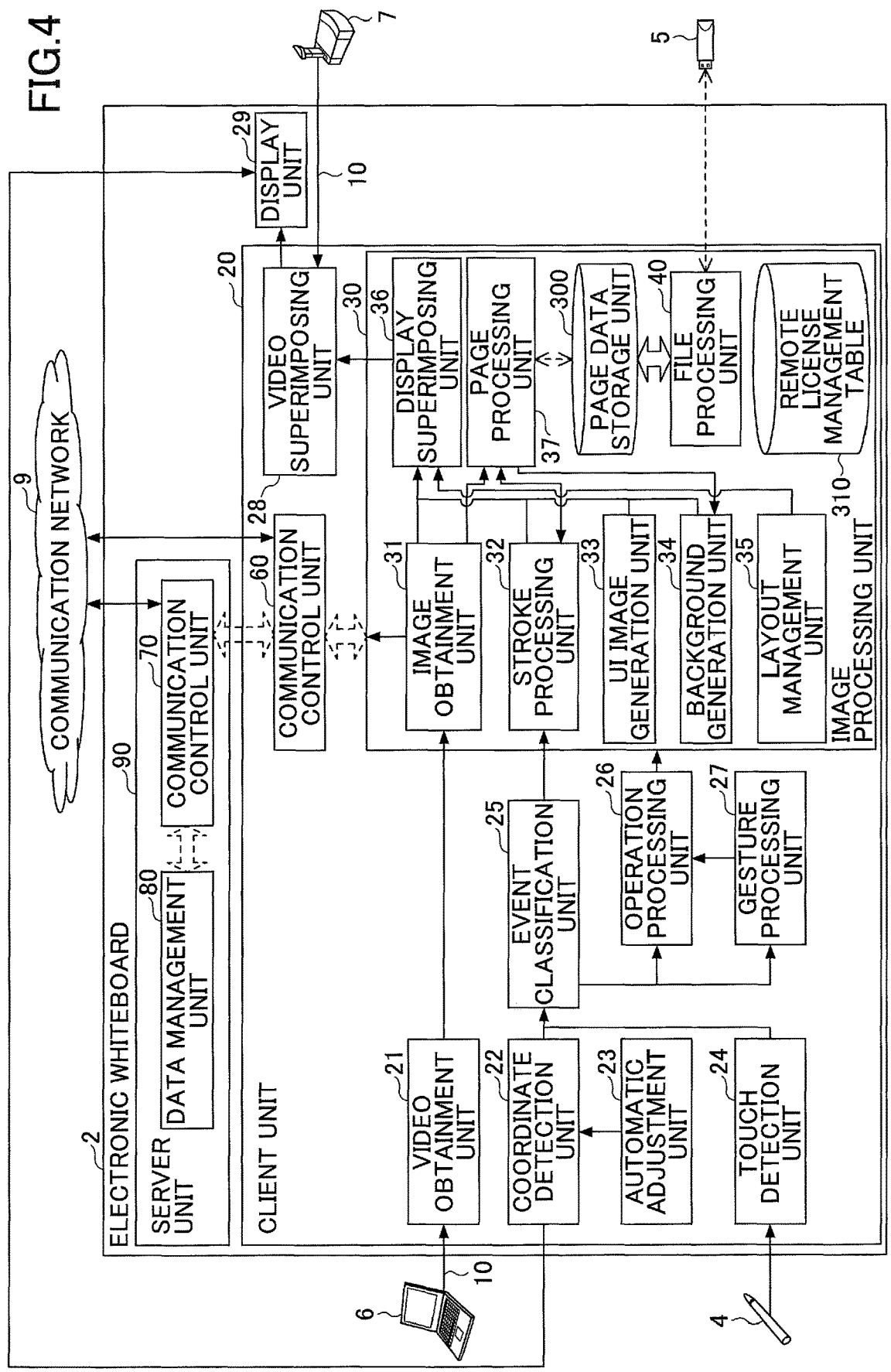
FIG. 4 is an example of a functional block diagram of an electronic whiteboard.
Figure 5:
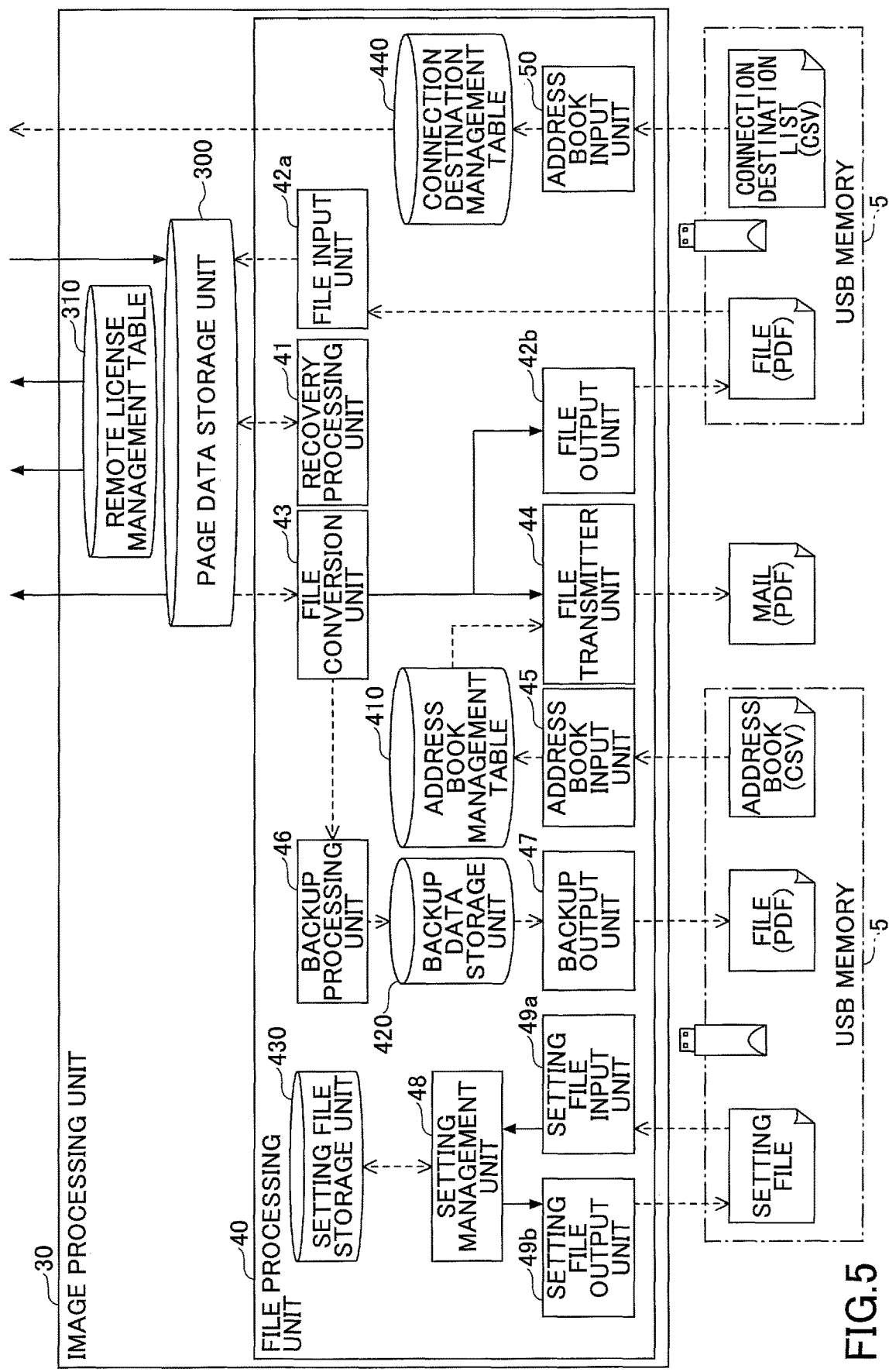
FIG. 5 is an example of a functional block diagram of a file processing unit.

Next, a functional configuration of the electronic whiteboard 2 will be described by using FIG. 4 to FIG. 6. First, an entire functional configuration of the electronic whiteboard 2 will be described by using FIG. 4. FIG. 4 is a functional block diagram of the electronic whiteboard 2.

The electronic whiteboard 2 includes functional units illustrated in FIG. 4 that are implemented by the hardware configuration illustrated in FIG. 3 and programs. The electronic whiteboard 2 may serve as a "host device" that initiates a remote sharing process, or may serve as a "participating device" that later participates a remote sharing process having been started already. Also, the electronic whiteboard 2 is constituted with two major units, namely, a client unit 20 and a server unit 90. The client unit 20 and the server unit 90 are functional units that are implemented in the housing of a single unit of the electronic whiteboard 2. If the electronic whiteboard 2 serves as the host device, the remote sharing process is implemented by the client unit 20 and the server unit 90 on this electronic whiteboard 2. On the other hand, if the electronic whiteboard 2 serves as the participating device, the client unit 20 operates on the electronic whiteboard 2 as the participating device, to provide functions of the participating device, but the server unit 90 does not operate. In other word, in FIG. 2, if the electronic whiteboard 2a serves as the host device, and the electronic whiteboard 2b serves as the participating device, the client unit 20 of the electronic whiteboard 2a communicates with the client unit 20 of the electronic whiteboard 2b on the other end via the server unit 90 implemented in the electronic whiteboard 2a on the same end. On the other hand, the client unit 20 of the electronic whiteboard 2b communicates with the client unit 20 of the electronic whiteboard 2a on the other end via the server unit 90 implemented in the electronic whiteboard 2a on the other end.

[Functional Configuration of Client Unit 20]

Next, a functional configuration of the client unit 20 will be described by mainly using FIG. 4 to FIG. 6. The client unit 20 includes a video obtainment unit 21, a coordinate detection unit 22, an automatic adjustment unit 23, a touch detection unit 24, an event classification unit 25, an operation processing unit 26, a gesture processing unit 27, a video superimposing unit 28, an image processing unit 30, and a communication control unit 60.

Among these, the video obtainment unit 21 obtains an output image of a video output device (the note PC 6, etc.) connected by the cable 10. In response to receiving an image signal from the video output device (the note PC 6, etc.), the video obtainment unit 21 analyzes this image signal to derive the resolution of an image frame, which is a display image formed by the video output device (the note PC 6, etc.) with this image signal, and image information about the update frequency of this image frame, and outputs the derived information to the image obtainment unit 31.

The coordinate detection unit 22 detects the coordinate position of an event generated by a user on the display 3 (a display unit 29) such as a touch operation by the user's hand H on the display 3 or the like. Also, the coordinate detection unit 22 detects the area of a touched part.

The automatic adjustment unit 23 is activated when the electronic whiteboard 2 is activated (or reactivated), to adjust parameters used when the coordinate detection unit 22, which detects coordinates by an optical sensor method, processes an image of a sensor camera so that the coordinate detection unit 22 can output appropriate values.

The touch detection unit 24 detects an event generated by the user, such as a pressing (touching) operation on the display 3 by the pen point of the electronic pen 4 or the pen tail of the electronic pen 4.

The event classification unit 25 classifies the coordinates position of an event detected by the coordinate detection unit 22, and a detection result detected by the touch detection unit 24, into one of events among a stroke drawing, a UI operation, and a gesture operation. Here, the "stroke drawing" is an event generated when a stroke image (B), which will be described later, illustrated in FIG. 6, is displayed on the display 3 by the user who presses the electronic pen 4 on the display 3, moves the electronic pen 4 while keeping the pressing state, and eventually detaches the electronic pen 4 from the display 3. By this stroke drawing, for example, a letter of the alphabet such as "S" or "T" is drawn on the display 3. Note that this "stroke drawing" includes not only drawing an image, but also an event of deleting an image that has been drawn already, and editing an image that has been drawn.

The "UI operation" is an event generated when a UI image (A), which will be described later, illustrated in FIG. 6, is displayed on the display 3 by the user who presses a predetermined position by the electronic pen 4 or the hand H. By this UI operation, for example, the color and the width of a line drawn by the electronic pen 4 are set.

The "gesture operation" is an event generated when a stroke image (B), which will be described later, illustrated in FIG. 6, is displayed on the display 3 by the user who touches the display 3 by the hand H, or moves the hand H on the display 3. By this gesture operation, for example, the user can enlarge (or reduce) an image, change a display area, or switch a page, by moving the hand H in a state where the hand H is kept touching on the display 3.

For a UI operation determined by the event classification unit 25, the operation processing unit 26 executes various operations following elements of the UI generated with the event. The elements of a UI may include, for example, a button, a list, a check box, and a text box. The gesture processing unit 27 executes an operation that corresponds to a gesture operation determined by the event classification unit 25.

The video superimposing unit 28 displays a video having an image superimposed by the display superimposing unit 36, which will be described later, on the display unit 29. The display unit 29 corresponds to display functions implemented on the display 3. Also, the video superimposing unit 28 displays a video transmitted from a video output device (the video-conference terminal 7 or the like), on a video from another video output device (the note PC 6, etc.) by picture-in-picture. Further, the video superimposing unit 28 executes switching for a video displayed on a part of the display unit 29 by picture-in-picture, to be displayed on the entire screen of the display unit 29.

The image processing unit 30 executes a process for superimposing image layers as illustrated in FIG. 6. This image processing unit 30 includes the image obtainment unit 31, a stroke processing unit 32, a UI image generation unit 33, a background generation unit 34, a layout management unit 35, the display superimposing unit 36, a page processing unit 37, a file processing unit 40, a page data storage unit 300, and a remote license management table 310.

Among these, the image obtainment unit 31 obtains, as images, frames in a video obtained by the video obtainment unit 21. The image obtainment unit 31 outputs data of these images to the page processing unit 37. This image corresponds to an output image (C) from a video output device (the note PC 6, etc.) illustrated in FIG. 6.

The stroke processing unit 32 draws an image, deletes a drawn image, or edits a drawn image, based on an event relating to a stroke drawing classified by the event classification unit 25. Such an image by a stroke drawing corresponds to a stroke image (B) illustrated in FIG. 6. Also, results of drawing, deleting, and editing images based on these stroke drawings are stored in a data management unit 80 as operation data, which will be described later.

The UI image generation unit 33 generates a UI (user interface) image set in the electronic whiteboard 2 in advance. Such a UI image corresponds to a UI image (A) illustrated in FIG. 6. The background generation unit 34 receives media data among page data read from the page data storage unit 300 by the page processing unit 37, from the page processing unit 37. The background generation unit 34 outputs this received media data to the display superimposing unit 36. Also, the image by this media data corresponds to a background image (D) illustrated in FIG. 6. The pattern of the background image (D) may be solid color, grid display, or the like.

The layout management unit 35 manages layout information that represents a layout of images output from the image obtainment unit 31, the stroke processing unit 32, the UI image generation unit 33, and the background generation unit 34, respectively, for the display superimposing unit 36. This makes it possible for the layout management unit 35 to issue a command to the display superimposing unit 36 about whether to display an output image (C) and a stroke image (B) or not to display, and if to display, positions in a UI image (A) and a background image (D).

Based on layout information output from the layout management unit 35, the display superimposing unit 36 lays out images output from the image obtainment unit 31, the stroke processing unit 32, and the UI image generation unit 33 (the background generation unit 34).

The page processing unit 37 aggregates data of the stroke image (B) and data of the output image (C) into single page data, and stores as the single page data in the page data storage unit 300. Data of a stroke image (B) constitutes a part of page data as stroke array data (stroke data items) represented by a stroke array data ID illustrated in Table 1. Data of an output image (C) constitutes a part of page data media data represented by a media data ID illustrated in Table 1. Once read from the page data storage unit 300, this media data is treated as data of a background image (D).

Also, the page processing unit 37 transmits the media data among the page data stored once, to the display superimposing unit 36 via the background generation unit 34 so that the video superimposing unit 28 can redisplay the background image (D) on the display 3. Also, the page processing unit 37 puts the stroke array data (stroke data items) among the page data back to the stroke processing unit 32 so as to put the strokes into a state in which editing can be done again. Further, the page processing unit 37 can delete or copy the page data.

In other words, data of the output image (C) displayed on the display 3 at the moment when the page processing unit 37 stores the page data in the page data storage unit 300, is first stored in the page data storage unit 300, and then, read out as media data that represents the background image (D) when read out from the page data storage unit 300. Then, among items of the page data read from the page data storage unit 300, the page processing unit 37 outputs the stroke array data that represents the stroke image (B) to the stroke processing unit 32. Also, among the items of the page data read from the page data storage unit 300, the page processing unit 37 outputs the media data that represents the background image (D) to the background generation unit 34.

The display superimposing unit 36 superimposes the output image (C) from the image obtainment unit 31, the stroke image (B) from the stroke processing unit 32, the UI image (A) from the UI image generation unit 33, and the background image (D) from the background generation unit 34, following the layout specified by the layout management unit 35. Thus, as illustrated in FIG. 6, the layers are in the sequence of the UI image (A), the stroke image (B), the output image (C), and the background image (D), and the user can see the superimposed images by this sequence.

Also, the display superimposing unit 36 can switch the superimposing for the image (C) and the image (D) illustrated in FIG. 6, respectively, so that one of the images (C) and (D) is exclusively superimposed on the image (A) and the image (B). For example, in a state where the image (A), the image (B), and the image (C) are displayed at first, if a cable 10 between the electronic whiteboard 2 and a video output device (the note PC 6, etc.) is pulled out, the layout management unit 35 may specify the image (C) as not to be superimposed, and to display the image (D). In this case, the display superimposing unit 36 may also execute processes for enlarging the display, reducing the display, and moving the display area.

The page data storage unit 300 stores page data as illustrated in Table 1.

TABLE 1

| PAGE DATA ID | START TIME | FINISH TIME | STROKE ARRAY DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

Table 1 schematically illustrates page data. The page data is data of one page to be displayed on the display 3 (stroke array data (stroke data items) and media data). Note that since the page data includes a lot of parameter types, here, contents of the page data are separated into Table 1 to Table 4 for the description.

As illustrated in Table 1, the page data includes the page data ID to identify a page; the start time that represents a time when displaying the page has been started; the finish time that represents a time when rewriting the content of the page by a stroke, a gesture, and the like has been finished; the stroke array data ID to identify stroke array data generated by strokes with the electronic pen 4 and the user's hand H; and the media data ID to identify media data, which are associated with each other. The stroke array data is data for displaying the stroke image (B) illustrated in FIG. 6, which will be described later, on the display 3. The media data is data for displaying the background image (D) illustrated in FIG. 6, which will be described later, on the display 3.

By the page data as such, for example, if the user draws a letter "S" of the alphabet by the electronic pen 4, it is a one-stroke drawing, and hence, the single letter "S" of the alphabet is represented by a single stroke data ID. On the other hand, if the user draws a letter "T" of the alphabet by the electronic pen 4, it is a two-stroke drawing, and hence, the single letter "T" of the alphabet is represented by two stroke data IDs.

The stroke array data also includes detailed information as illustrated in FIG. 28. FIG. 28 schematically illustrates the stroke array data. As illustrated in FIG. 28, a chunk of stroke array data is represented by multiple records of stroke data. A record of stroke data includes the stroke data ID to identify the record of stroke data; the start time that represents a time when a corresponding stroke has been started to be written; the finish time that represents a time when the stroke writing has been completed; the stroke color; the stroke width; and the coordinate array data ID to identify an array of passing points of the stroke.

Further, this coordinate array data ID includes detailed information as illustrated in FIG. 29. FIG. 29 schematically illustrates the coordinates array data. As illustrated in FIG. 29, the coordinate array data includes information about, for each point of a stroke, (X coordinate value, Y coordinate value) of the point on the display 3, the time difference (ms) from the start time of the stroke when passing on this point, and the pen pressure of the electronic pen 4 at this point. In other words, a collection of points illustrated in FIG. 29 is represented by a record of coordinate array data illustrated in FIG. 28. For example, if the user draws a letter "S" of the alphabet by the electronic pen 4, it is one-stroke drawing that passes through multiple passing points, and the information about these multiple passing points is represented by the coordinate array data.

Also, the media data among the items of the page data illustrated in Table 1 represents detailed information as illustrated in Table 4.

TABLE 4

| MEDIA DATA ID | DATA TYPE | RECORD OF TIME | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ⋮ | ⋮ | ⋮ | ⋮ | ⋮ | ⋮ | ⋮ | ⋮ |

Table 4 schematically illustrates the media data. As illustrated in Table 4, the media data includes the media data ID in the page data illustrated in Table 1; the data type of the media data; the record of time when the page processing unit 37 has recorded the page data in the page data storage unit 300; the position (X coordinate value, Y coordinate value) and the size (width, height) of an image to be displayed on the display 3; and the data representing content of the media data, which are associated with each other. Among these, the position of an image to be displayed on the display 3 by the page data represents the position of the upper left end of the image displayed by the page data, relative to the coordinates of the upper left end of the display 3 represented by (X coordinate value, Y coordinate value)=(0, 0).

Referring back to FIG. 4, the description will continue. The remote license management table 310 manages license data that is required for executing a remote sharing process. In this remote license management table 310, as illustrated in Table 5, the product ID of the electronic whiteboard 2, the license ID used for authentication, and the expiration date of the license are associated with other to be managed.

TABLE 5

| PRODUCT ID | LICENSE ID | EXPIRATION DATE |
|---|---|---|
| 1001 | 12345678abcdefgh | 2012 Dec. 31 |
| 1001 | 4321dcba8765hgfe | — |
| ⋮ | ⋮ | ⋮ |

(Functional Configuration of File Processing Unit 40)

Next, a functional configuration of the file processing unit 40 illustrated as an element in FIG. 4 will be described by using FIG. 5. Note that FIG. 5 is an example of a functional block diagram of the file processing unit 40. The file processing unit 40 includes a recovery processing unit 41, a file input unit 42a, a file output unit 42b, a file conversion unit 43, a file transmitter unit 44, an address book input unit 45, a backup processing unit 46, a backup output unit 47, a setting management unit 48, a setting file input unit 49a, a setting file output unit 49b, and an address book input unit 50. The file processing unit 40 further includes an address book management table 410, a backup data storage unit 420, a setting file storage unit 430, and a connection destination management table 440.

Among these, the recovery processing unit 41 detects an abnormal end if the electronic whiteboard 2 has been terminated abnormally, and recovers unsaved page data. For example, in case of a normal end, the page data is recorded as a PDF file on a USB memory 5 via the file processing unit 40. However, in case of an abnormal end due to the power down or the like, the page data may remain recorded on the page data storage unit 300. Therefore, when the power is turned on again, the recovery processing unit 41 reads the page data from the page data storage unit 300 to recover the data.

The file input unit 42a reads a PDF file from the USB memory 5, and stores each page as page data in the page data storage unit 300. The file conversion unit 43 converts the page data stored in the page data storage unit 300 into a file in a PDF format.

The file output unit 42b records a PDF file output by the file conversion unit 43 on the USB memory 5.

The file transmitter unit 44 attaches a PDF file generated by the file conversion unit 43 to an e-mail, to transmit the file. The transmission destination of this file is determined by first having the display superimposing unit 36 display contents of the address book management table 410 on the display 3, and then, having the file transmitter unit 44 receive selection of a destination by an operation on an input unit such as a touch panel by the user. In the address book management table 410, as illustrated in Table 6, a user ID, a user name, an e-mail address of the user, and a department are associated with each other to be managed.

TABLE 6

| USER ID | USER NAME | MAIL ADDRESS | DEPARTMENT |
|---|---|---|---|
| 001 | nama1 | nama1@mail.com | DEPARTMENT 1 |
| 002 | nama2 | nama2@mail.com | DEPARTMENT 2 |
| 003 | nama3 | nama3@mail.com | DEPARTMENT 3 |
| ⋮ | ⋮ | ⋮ | ⋮ |

Also, the file transmitter unit 44 may receive input of a mail address as a destination by an operation on an input unit such as a touch panel by the user.

The address book input unit 45 reads a list file of mail addresses from the USB memory 5, and manages contents of the file in the address book management table 410.

The backup processing unit 46 stores a file output by the file output unit 42b, and a file transmitted by the file transmitter unit 44 in the backup data storage unit 420 for backup. Note that if the user does not specify a setting for backup, a backup process is not executed. Backup data is stored in a PDF format as illustrated in Table 7.

TABLE 7

| iwb_20130610104423.pdf |
|---|
| iwb_20130625152245.pdf |
| iwb_20130628113418.pdf |
| ⋮ |

The backup output unit 47 stores the backup file in the USB memory 5. Upon storing the backup file, the user operates on an input unit such as a touch panel to input a path code for security.

The setting management unit 48 stores and reads various setting information items of the electronic whiteboard 2 on the setting file storage unit 430, to manage the settings. These various setting information items include, for example, settings of the network, settings of the date and time, settings of the region and language, settings of a mail server 13, settings of address books, settings of a connection destination list, and settings of backup. Note that the settings of the network include, for example, a setting of the IP address of the electronic whiteboard 2, a setting of the netmask, a setting of a default gateway, and a setting of a DNS (Domain Name System).

The setting file output unit 49b records the various setting information items of the electronic whiteboard 2 on the USB memory 5 as a setting file. Note that the user cannot see content of the setting file for security.

The setting file input unit 49a reads the setting file stored in the USB memory 5, to reflect the various setting information items as various settings on the electronic whiteboard 2.

The address book input unit 50 reads the list file of connection destination IP addresses for a remote sharing process from the USB memory 5, and manages the content of the file in the connection destination management table 440. Table 8 illustrates an example of the connection destination management table 440.

TABLE 8

| NAME | IP ADDRESS |
| --- | --- |
| CONFERENCE ROOM 1 | 192.0.0.1 |
| CONFERENCE ROOM 2 | 192.0.0.2 |
| — | 192.0.0.3 |
| ⋮ | ⋮ |

The connection destination management table 440 is a table for managing IP addresses of electronic whiteboards 2 each of which may serve as a host device. The IP addresses are stored in advance to save time and effort to input the IP address of an electronic whiteboards 2 serves as the host device of a remote sharing process in which the electronic whiteboard 2 holding this table is to participate as a participating device. In this connection destination management table 440, the name of a site where an electronic whiteboard 2 is installed that accepts a request for participation when serving as the host device, and the IP address of the electronic whiteboard 2 as the host device, are associated with each other to be managed.

Note that the connection destination management table 440 may be omitted. In this case, however, the user of the participating device needs to input the IP address of the host device on an input unit such as a touch panel to start a request for remote processing with the host device. Therefore, the user of the participating device obtains the IP address of the host device from a user of the host device by telephone, e-mail, and the like.

The communication control unit 60 of the client unit 20 communicates with the server unit 90 of the same electronic whiteboard 2 (in case of the same electronic whiteboard 2 being the host device), or the server unit 90 of another electronic whiteboard 2 connected via the communication network 9 (in case of the same electronic whiteboard 2 being a participating device), so as to obtain page data from the server unit 90.

The server unit 90 also includes the data management unit 80 and a communication control unit 70. The data management unit 80 manages operation data, image data, and the like, and manages page data distributed to the client unit 20 of a host device or a participating device. Also, the communication control unit 70 of the server unit 90 distributes page data to the client unit 20 of a host device or a participating device. Functions of the server unit 90 and the communication control unit 60 will be described appropriately when necessary for describing the embodiment.

<Processes or Operations in the Embodiment>

Figure 7:
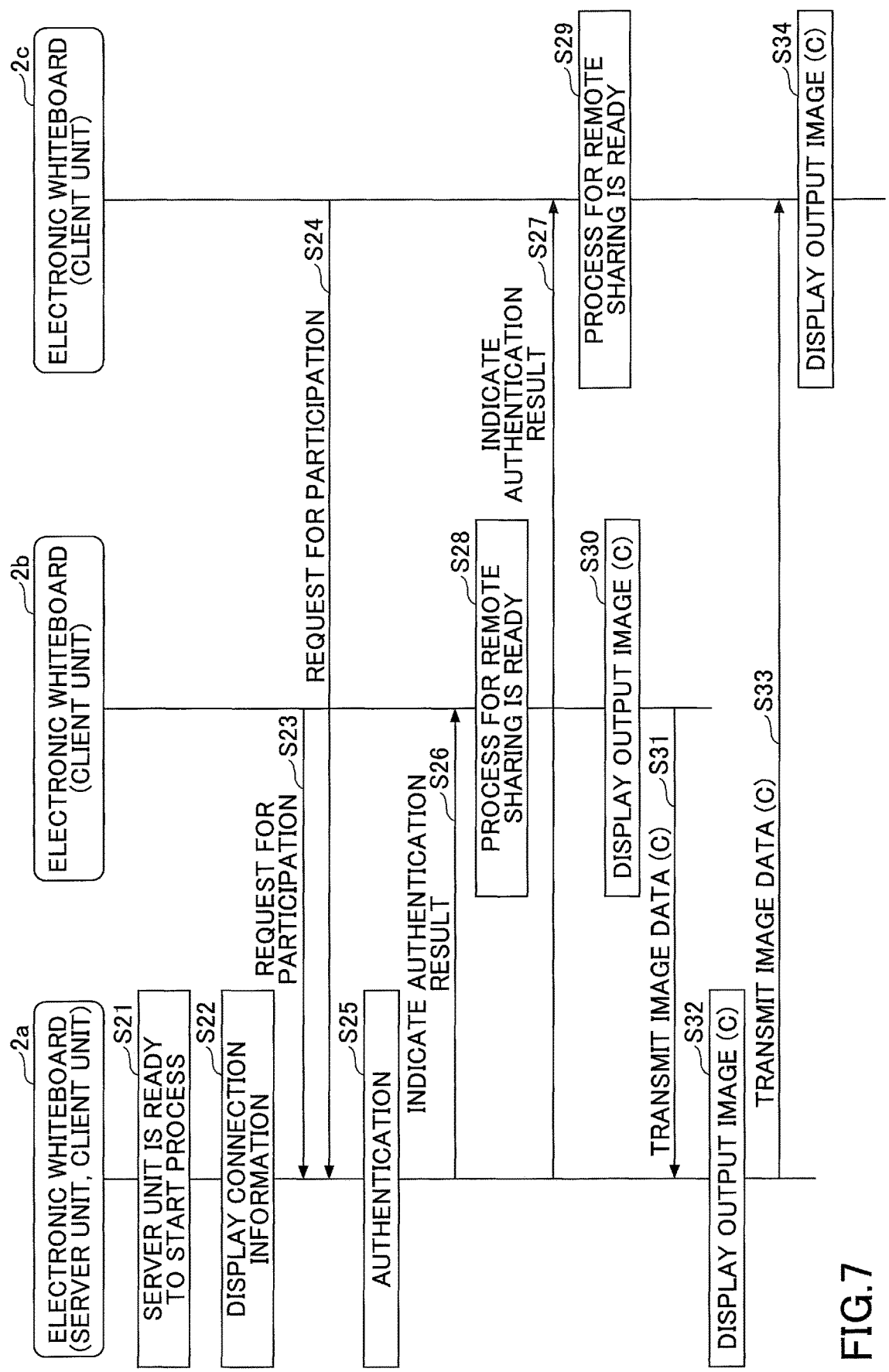
FIG. 7 is an example of a sequence chart illustrating processes of electronic whiteboards.
Figure 8:
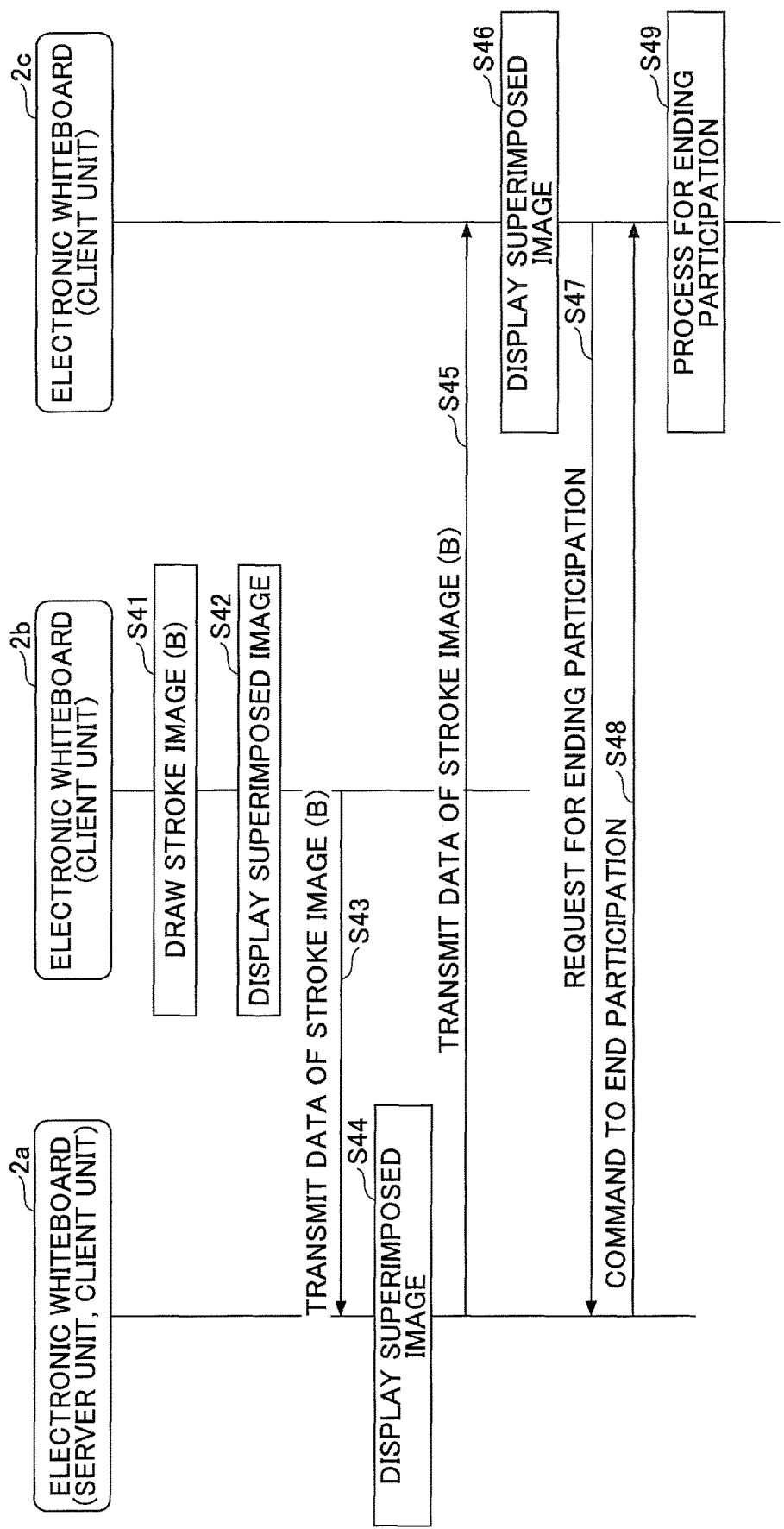
FIG. 8 is an example of a sequence chart illustrating processes of electronic whiteboards.

Next, by using FIG. 7 and FIG. 8, processes or operations in the embodiment will be described. Note that FIG. 7 and FIG. 8 are sequence charts illustrating processes of the electronic whiteboard 2. Using FIG. 7 and FIG. 8, the embodiment will be described for a case where the electronic whiteboard 2a serves as the host device (the server unit and the client unit) holding a remote sharing process, and the electronic whiteboards 2b and 2c serve as respective participating devices (the client units) that participate in the remote sharing process. Also, here, the electronic whiteboards 2a, 2b, and 2c have the displays 3a, 3b, and 3c connected, respectively, and further, have the note PCs 6a, 6b, and 6c connected, respectively. Also, the electronic pens 4a 4b, and 4c are used on the electronic whiteboards 2a, 2b, and 2c, respectively.

(Process for Participation)

First, a process will be described for the electronic whiteboards 2b and 2c to participate in a remote sharing process, by using FIG. 7.

Once the power switch of the electronic whiteboard 2a is turned on by the user, the client unit 20 of the electronic whiteboard 2a is activated. Then, when the user performs an operation to activate the server unit 90 on an input unit such as a touch panel, a command to start a process on the server unit 90 is output by the communication control unit 60 of the client unit 20, to the communication control unit 70 in the server unit 90 of the same electronic whiteboard 2a. Thus, on the electronic whiteboard 2a, not only the client unit 20, but also the server unit 90 become ready to start various processes (Step S21).

Next, the UI image generation unit 33 in the client unit 20 of the electronic whiteboard 2a generates connection information for establishing a connection with the electronic whiteboard 2a, and the video superimposing unit 28 displays the connection information obtained from the UI image generation unit 33 via the display superimposing unit 36, on the display 3a (Step S22).

This connection information includes the IP address of the host device and a path code that has been generated for the current remote sharing process. In this case, the path code stored in the data management unit 80 is read by the data management unit 80, and transmitted from the communication control unit 70 to the communication control unit 60 of the client unit 20. The path code is further transmitted from the communication control unit 60 to the image processing unit 30, and eventually input into the UI image generation unit 33. Thus, the connection information includes the path code. Then, the user of the electronic whiteboard 2a transfers the connection information to users of the electronic whiteboards 2b and 2c by telephone or e-mail. Note that if the connection destination management table 440 is provided, a participating device can make a request for participation even if the IP address of the host device is not included the connection information.

Next, on the electronic whiteboards 2b and 2c, in response to receiving input of the connection information by an operation by the user on an input unit such as a touch panel, the communication control unit 60 in the client unit 20 of each of the electronic whiteboards 2a and 2b transmits the path code to the communication control unit 70 in the server unit 90 of the electronic whiteboard 2a via the communication network 9 based on the IP address in the connection information, to make a request for participation (Steps S23 and S24). Thus, the communication control unit 70 receives the requests for participation (including the path codes) from the electronic whiteboards 2b and 2c, respectively, and outputs the path codes to the data management unit 80.

Next, the data management unit 80 executes authentication with the path codes received from the electronic whiteboards 2b and 2c by using managed path codes, respectively (Step S25).

Then, the communication control unit 70 indicates the authentication results to the client units 20 of the electronic whiteboards 2b and 2c, respectively (Steps S26 and S27).

If the electronic whiteboards 2b and 2c have been determined to be valid electronic whiteboards by the authentication at Step S25, communication is established for the remote sharing process between the electronic whiteboard 2a being the host device and the electronic whiteboards 2b and 2c and being the participating devices, and the communication control unit 60 in the client unit 20 of each of the electronic whiteboards 2b and 2c becomes ready to start the remote sharing process with the other electronic whiteboards 2 (Steps S28 and S29).

(Displaying Output Image)

Next, a process for displaying an output image (C) in a remote sharing process will be described by using FIG. 7.

First, the electronic whiteboard 2b displays an output image (C) on the display 3b (Step S30). Specifically, the image obtainment unit 31 of the electronic whiteboard 2b receives data of an output image (C) displayed on the note PC 6b from the note PC 6b via the video obtainment unit 21, and transmits the data to the display 3b via the display superimposing unit 36 and the video superimposing unit 28, to display the output image (C) on the display 3b.

Next, the image processing unit 30 including the image obtainment unit 31 of the electronic whiteboard 2b transmits the data of the output image (C) to the communication control unit 60, and the communication control unit 60 transmits the data of the output image (C) to the communication control unit 70 of the electronic whiteboard 2a being the host device via the communication network 9 (Step S31). Thus, the communication control unit 70 of the electronic whiteboard 2a receives the data of the output image (C), and outputs the data to the data management unit 80, to store the data of the output image (C) in the data management unit 80.

Next, the electronic whiteboard 2a being the host device displays the output image (C) on the display 3a (Step S32). Specifically, the data management unit 80 of the electronic whiteboard 2a outputs the data of the output image (C) received from the communication control unit 70 to the communication control unit 60 in the client unit 20 of the electronic whiteboard 2a being the same host device. The communication control unit 60 outputs the data of the output image (C) to the display superimposing unit 36. The display superimposing unit 36 outputs the data of the output image (C) to the video superimposing unit 28. The video superimposing unit 28 outputs the data of the output image (C) to the display 3a. Thus, the display 3a displays the output image (C).

Next, the communication control unit 70 in the server unit 90 of the electronic whiteboard 2a as the host device transmits the data of the output image (C) to the communication control unit 60 of the electronic whiteboard 2c, which is not the electronic whiteboard 2b being the transmission source of the data of the output image (C), via the communication network 9 (Step S33). Thus, the communication control unit 60 of the electronic whiteboard 2c being the participating device receives the data of the output image (C).

Next, the electronic whiteboard 2c displays the output image (C) on the display 3c (Step S34). Specifically, the communication control unit 60 of the electronic whiteboard 2c outputs the data of the output image (C) received at Step S33 as described above to the display superimposing unit 36 of the electronic whiteboard 2c. The display superimposing unit 36 outputs the data of the output image (C) to the video superimposing unit 28. The video superimposing unit 28 outputs the data of the output image (C) to the display 3c. Thus, the display 3c displays the output image (C).

Note that if respective data items of the UI image (A) and the stroke image (B) in addition to the data of the output image (C) are input into the video superimposing unit 28, the display superimposing unit 36 generates a superimposed image (A, B, C), and the video superimposing unit 28 outputs the data of the superimposed image (A, B, C) on the display 3c. Also, if data of a video (E) for a video conference has been transmitted from the video-conference terminal 7 to the video superimposing unit 28, the video superimposing unit 28 superimposes the data of the video (E) for the video conference with the superimposed image (A, B, C) by picture-in-picture, and outputs the superimposed data on the display 3c.

(Displaying Superimposed Image)

Next, a process for displaying a superimposed image in a remote sharing process will be described by using FIG. 8.

First, the user of the electronic whiteboard 2b draws a stroke image (B) on the electronic whiteboard 2b by using the electronic pen 4b (Step S41).

Next, as illustrated in FIG. 6, the display superimposing unit 36 of the electronic whiteboard 2b superimposes the stroke image (B) with a UI image (A) and an output image (C), and the video superimposing unit 28 displays the superimposed image (A, B, C) on the display 3b of the electronic whiteboard 2b (Step S42). Specifically, the stroke processing unit 32 of the electronic whiteboard 2b receives the data of the stroke image (B) as operation data from the coordinate detection unit 22 and the touch detection unit 24 via the event classification unit 25, and transmits the data to the display superimposing unit 36. Thus, the display superimposing unit 36 can superimpose the stroke image (B) with the UI image (A) and the output image (C), the video superimposing unit 28 can display the superimposed image (A, B, C) on the display 3b of the electronic whiteboard 2b.

Next, the image processing unit 30 including the stroke processing unit 32 of the electronic whiteboard 2b transmits the data of the stroke image (B) to the communication control unit 60 so that the communication control unit 60 of the electronic whiteboard 2b transmits the data of the stroke image (B) to the communication control unit 70 of the electronic whiteboard 2a being the host device via the communication network 9 (Step S43).

Thus, the communication control unit 70 of the electronic whiteboard 2a receives the data of the stroke image (B), and outputs the data to the data management unit 80. In this way, upon each drawing, the data of the stroke image (B) drawn on the electronic whiteboard 2b is sequentially transmitted to the data management unit 80 of the electronic whiteboard 2a being the host device. This data of the stroke image (B) is data represented by each stroke data ID illustrated in FIG. 28. Therefore, for example, as described above, if the user draws a letter "T" of the alphabet by the electronic pen 4, it is a two-stroke drawing, and hence, the data of the stroke image (B) is transmitted for the two stroke data IDs sequentially.

Next, the electronic whiteboard 2a being the host device displays the superimposed image (A, B, C) including the data of the stroke image (B) transmitted from the electronic whiteboard 2b, on the display 3a (Step S44). Specifically, the data management unit 80 of the electronic whiteboard 2a synthesizes multiple data items of the stroke images (B) having been sequentially transmitted, and stores the synthesized data. Thus, the data management unit 80 outputs the data of the stroke image (B) having been synthesized to the communication control unit 70. The communication control unit 70 outputs the data of the stroke image (B) having been synthesized, to the communication control unit 60 in the client unit 20 of the electronic whiteboard 2a being the same host device. The communication control unit 60 outputs the data of the stroke image (B) having been synthesized to the display superimposing unit 36 in the image processing unit 30. Thus, the display superimposing unit 36 superimposes the stroke image (B) having been synthesized with the UI image (A) and the output image (C). Finally, the video superimposing unit 28 displays the superimposed image (A, B, C) superimposed by the display superimposing unit 36 on the display 3a.

Next, the communication control unit 70 in the server unit 90 of the electronic whiteboard 2a as the host device transmits the data of the stroke image (B) to the communication control unit 60 of the electronic whiteboard 2c, which is not the electronic whiteboard 2b being the transmission source of the data of stroke image (B), via the communication network 9 (Step S45). Thus, the communication control unit 60 of the electronic whiteboard 2c being the participating device receives the data of the stroke image (B).

Next, the electronic whiteboard 2c displays the superimposed image (A, B, C) on the display 3c (Step S46). Specifically, the communication control unit 60 of the electronic whiteboard 2c outputs the data of the stroke image (B) having been synthesized received at Step S45 described above to the image processing unit 30 of the electronic whiteboard 2c. The display superimposing unit 36 of the image processing unit 30 superimposes the data of the UI image (A) and the output image (C) with the data of the stroke image (B) having been synthesized, and outputs the data of the superimposed image (A, B, C) to the video superimposing unit 28. The video superimposing unit 28 outputs the data of the superimposed image (A, B, C) to the display 3c. Thus, the display 3c displays the superimposed image (A, B, C).

Note that although the output image (C) is displayed on the display 3 in the process described above, the background image (D) may be displayed instead of this output image (C). Alternatively, the output image (C) and the background image (D) need not to be in an exclusive relationship; both the output image (C) and the background image (D) may be displayed on the display 3 at the same time.

(Ending Participation)

Next, a process for ending participation in a remote sharing process by a participating device will be described by using FIG. 8. In the embodiment illustrated in FIG. 8, a process is illustrated for the electronic whiteboard 2c to end the participation.

First, in response to receiving a request for ending the participation by an operation on an input unit such as a touch panel by the user, the communication control unit 60 in the electronic whiteboard 2c makes a request for ending the participation to the communication control unit 70 in the server unit 90 of the electronic whiteboard 2a as the host device (Step S47). Thus, the communication control unit 70 receives the request for ending the participation from the electronic whiteboard 2c, and outputs the request for ending the participation to the data management unit 80 along with the IP address of the electronic whiteboard 2c. Then, based on the IP address transmitted from the communication control unit 70, the data management unit 80 of the electronic whiteboard 2a deletes the IP address of the electronic whiteboard 2c having made the request for ending the participation, and the name of a site where the electronic whiteboard 2c is installed, and outputs an indication that includes the IP address of the electronic whiteboard 2c and a message that the IP address has been deleted, to the communication control unit 70.

Next, the communication control unit 70 issues a command to end the participation to the communication control unit 60 in the client unit 20 of the electronic whiteboard 2c via the communication network 9 (Step S48). Then, to complete ending the participation, the communication control unit 60 in the electronic whiteboard 2c disconnects the communication for the remote sharing process, and the participation ends (Step S49).

<About Functions of Electronic Whiteboard>

Next, association between a user who uses the electronic whiteboard 2 and page data generated by the user will be described.

Figure 9:
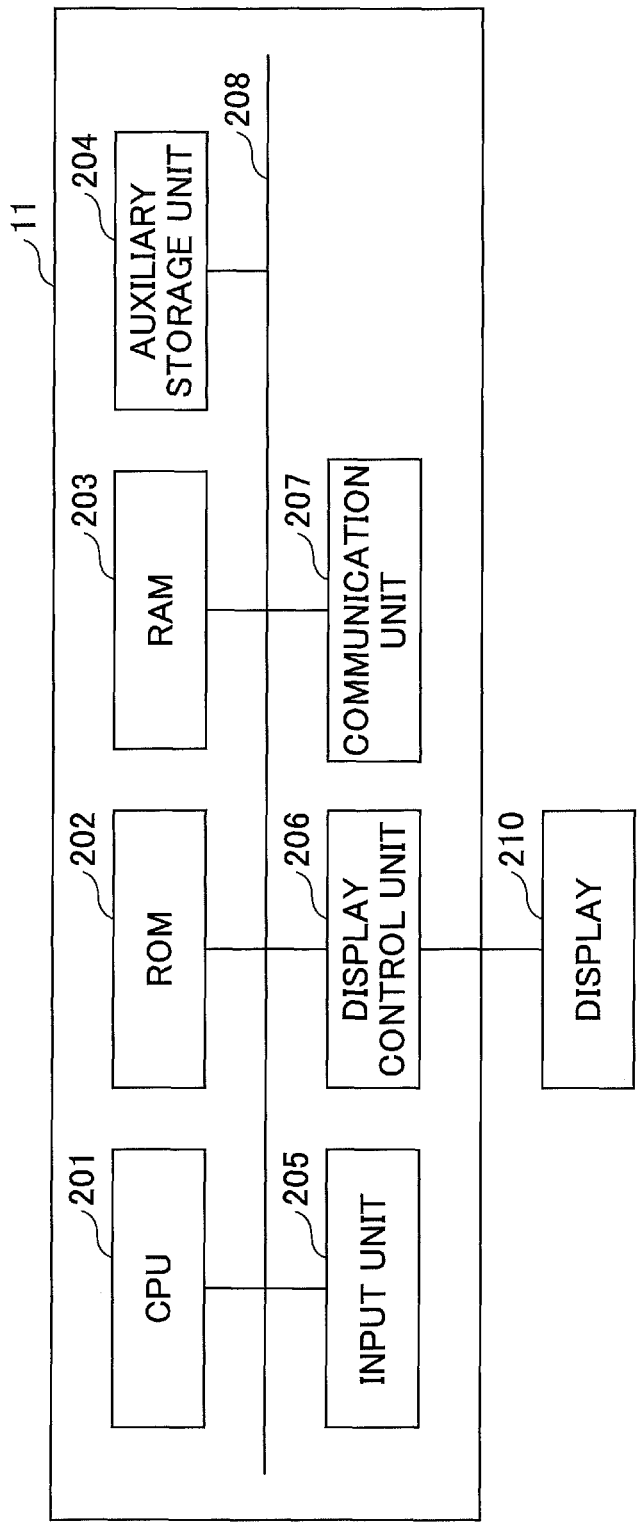
FIG. 9 is an example of a hardware configuration diagram of an account server.

First, a hardware configuration of the account server 11 will be described by using FIG. 9. FIG. 9 is an example of a hardware configuration diagram of the account server 11. The account server 11 includes a CPU 201, a ROM 202, a RAM 203, and an auxiliary storage unit 204. The account server 11 further includes an input unit 205, a display control unit 206, and a communication unit 207. Note that the units of the account server 11 are mutually connected via a bus 208. As such, the account server 11 includes functions of an information processing apparatus.

The CPU 201 executes various programs and an OS (Operating System) stored in the auxiliary storage unit 204. The ROM 202 is a non-volatile memory. The ROM 202 stores programs, data, and the like that are required for the CPU 201 to execute the various programs stored in the auxiliary storage unit 204.

The RAM 203 is a main memory unit such as a DRAM (Dynamic Random Access Memory), an SRAM (Static Random Access Memory), or the like. The various programs stored in the auxiliary storage unit 204 are loaded into the RAM 203 when to be executed by the CPU 201, and the RAM 203 serves as a work area for the CPU 201.

The auxiliary storage unit 204 stores the various programs executed by the CPU 201, and various databases that are used when the various programs are executed by the CPU 201. The auxiliary storage unit 204 is a non-volatile memory, for example, an HDD (Hard Disk Drive), an SSD (Solid State Drive), or the like.

The input unit 205 is an interface for an operator to input various commands on the account server 11, and includes, for example, a keyboard, a mouse, a touch panel, and an audio input unit. Further, an attachment unit for a recording medium or the like such as a USB I/F may be included.

The display control unit 206 displays various information items held in the account server 11 in response to a request from the CPU 201, in forms of cursors, menus, windows, characters, and images on a display 210. The display control unit 206 is, for example, a graphic chip or a display I/F.

The communication unit 207 is a network I/F to communicate with the electronic whiteboard 2 via the communication network 9.

<About Functions>

<<Electronic Whiteboard>>

Figure 10:
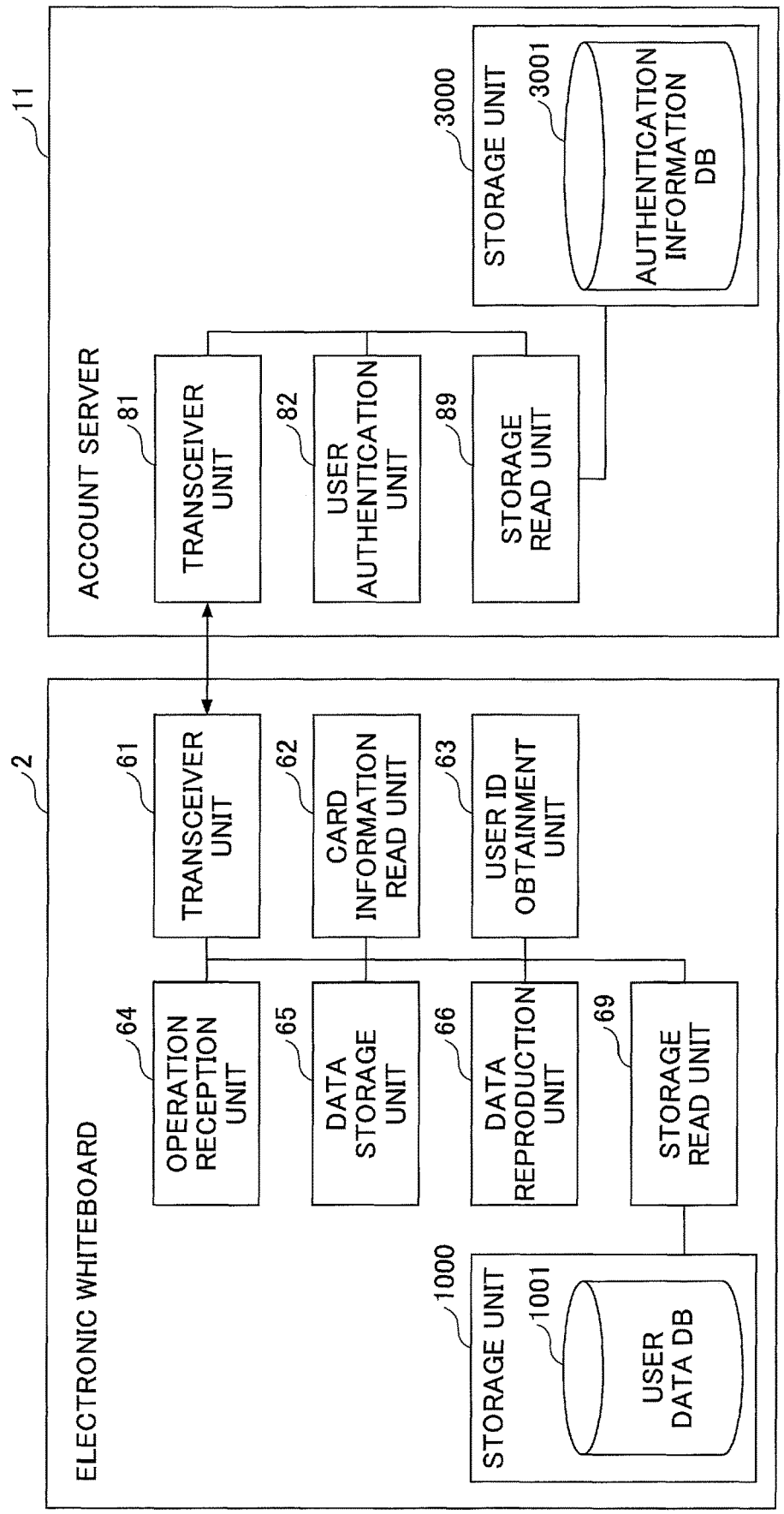
FIG. 10 is an example of a functional block diagram of an electronic whiteboard and an account server.

FIG. 10 is an example of a functional block diagram of the electronic whiteboard 2 and the account server 11. The functional block diagram in FIG. 4 relates to image sharing, whereas the functional block diagram in FIG. 10 illustrates functional blocks relating to association between a user and page data generated by the user.

The electronic whiteboard 2 includes a transceiver unit 61, a card information read unit 62, a user ID obtainment unit 63, an operation reception unit 64, a data storage unit 65, a data reproduction unit 66, and a storage read unit 69. These units are functional units implemented or provided by one or more of the elements illustrated in FIG. 3, operating under instructions from the CPU 101 following a program loaded into the RAM 103 from the SSD 104.

Also, the electronic whiteboard 2 includes a storage unit 1000 constituted with one of the RAM 103, the ROM 102, and the SSD 104 illustrated in FIG. 3. The storage unit 1000 stores a user data DB 1001.

TABLE 9

| USER ID | FILE NAME |
|---------|-----------|
| 001 | nama1_01.pdf |
| 002 | nama2_01.pdf |
| 003 | nama3_01.pdf |
| ⋮ | ⋮ |

Table 9 illustrates information held in the user data DB 1001 built in the storage unit 1000 of the electronic whiteboard 2, in a tabular format. This table is referred to as the "user data table". The user data table has filenames and the like registered that are associated with respective user IDs. As described above, the user ID is information to uniquely identify a user. Also, the filename is the filename of a file in which page data used by the user is stored. In other word, the file stores page data that includes data of a stroke image (B) handwritten by the user on the display 3 after the login of the user until the logout, and an output image (C), for example, as a PDF file. The electronic whiteboard 2 can read a PDF file identified by a user ID from the user data DB 1001, to display the content on the display 3. Note that the format of the file may not be PDF, but may be any highly general-purpose file format, for example, Word (trademark), or XML (Extensible Markup Language).

(About Functions of Electronic Whiteboard)

The transceiver unit 61 of the electronic whiteboard 2 is implemented by the CPU 101, the network controller 105, and the like illustrated in FIG. 3, to transmit and receive various data items with the account server 11 and other electronic whiteboards 2. Note that in the following, description about "via the transceiver unit 61" may be omitted even when the electronic whiteboard 2 transmits and receives data.

The card information read unit 62 is implemented by the CPU 101, the RF tag reader 117, and the like illustrated in FIG. 3, to read out card information from the IC card 130. The card information is a unique combination of characters, digits, alphabets, and the like, to identify the IC card 130.

The user ID obtainment unit 63 is implemented by the CPU 101 and the like illustrated in FIG. 3, to transmit the card information to the account server 11 so as to obtain the user ID from the account server 11.

The operation reception unit 64 is implemented by the CPU 101, the touch sensor 115, the electronic pen controller 116, and the like illustrated in FIG. 3, to receive various operations on the electronic whiteboard 2 by the user. Note that the operation reception unit 64 may also serve as the stroke processing unit 32, the operation processing unit 26, and the gesture processing unit 27 in FIG. 4.

The data storage unit 65 is implemented by the CPU 101 and the like illustrated in FIG. 3, to store page data in the user data DB 1001. Page data is stored, for example, upon a logout of the user, but may be stored at any other timing.

The data reproduction unit 66 is implemented by the CPU 101 and the like illustrated in FIG. 3, to read out page data stored in the user data DB 1001, and to display the read data on the display 3. For example, as the user ID of a login user can be obtained from the account server 11, the page data of the user may be displayed just after the login or any time after the login.

The storage read unit 69 is implemented by the CPU 101 and the like illustrated in FIG. 3, to read out various data items stored in the storage unit 1000, and to write various data items in the storage unit 1000. Note that in the following, description about "via the storage read unit 69" may be omitted even when the storage read unit 69 executes a read or a write on the storage unit 1000.

<<Account Server 11>>

The account server 11 includes a transceiver unit 81, a user authentication unit 82, and a storage read unit 89. These units are functional units implemented or provided by one or more of the elements illustrated in FIG. 9, operating under instructions from the CPU 201 following a program loaded into the RAM 203 from the auxiliary storage unit 204.

The account server 11 also includes a storage unit 3000 constituted with one of the ROM 202, the RAM 203, and the auxiliary storage unit 204 illustrated in FIG. 9. The storage unit 3000 stores an authentication information DB 3001.

TABLE 10

| CARD INFORMATION | USER ID | PASSWORD | USER NAME |
|------------------|---------|----------|-----------|
| 0123456789 | 001 | **** | nama1 |
| 1234567890 | 002 | **** | nama2 |
| 2345678901 | 003 | **** | nama3 |
| ⋮ | ⋮ | ⋮ | ⋮ |

Table 10 illustrates information held in the authentication information DB 3001 built in the storage unit 3000 of the account server 11, in a tabular format. This table is referred to as the "authentication information table". The authentication information table has card information, user ID, password, user name, and the like registered. Since a user holding the IC card 130 is estimated to be the genuine owner of the card, and the account server 11 can identify the user (user ID, etc.) by the card information. Also, the password is used for authenticating the user, and is confidential information that is only known to the user in principle. If a pair of the user name and the password is stored in the authentication information DB 3001, the account server 11 can determine that the user authentication has succeeded, to identify the user (user ID, etc.). Note that the account server 11 may have the user name, the mail address, the department, and the like in Table 6.

(About Functions of Account Server 11)

The transceiver unit 81 of the account server 11 is implemented by the CPU 201, the communication unit 207, and the like illustrated in FIG. 9, to transmit and receive various data items with the electronic whiteboard 2 and the like. Note that in the following, description about "via the transceiver unit 81" may be omitted even when the account server 11 transmits and receives data.

The user authentication unit 82 is implemented by the CPU 201 and the like illustrated in FIG. 9, to read the user ID associated with the card information (or a pair of a user name and a password) transmitted from the electronic whiteboard 2, out of the authentication information DB 3001. This user ID is transmitted to the electronic whiteboard 2.

The storage read unit 89 is implemented by the CPU 201 and the like illustrated in FIG. 9, to read various data items stored in the storage unit 3000, and to write various data items in the storage unit 3000. Note that in the following, description about "via the storage read unit 89" may be omitted even when the storage read unit 89 executes a read or a write on the storage unit 3000.

<User Authentication>

Figure 11A:
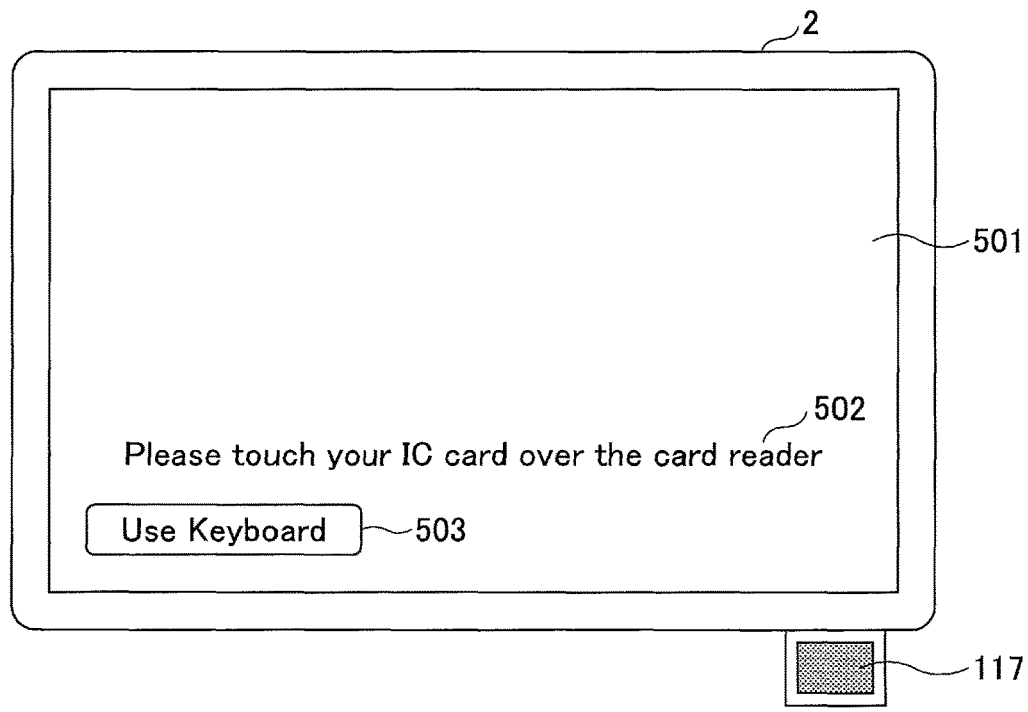
FIGS. 11A-11B are diagrams illustrating examples of authentication screens displayed on a display.
Figure 11B:
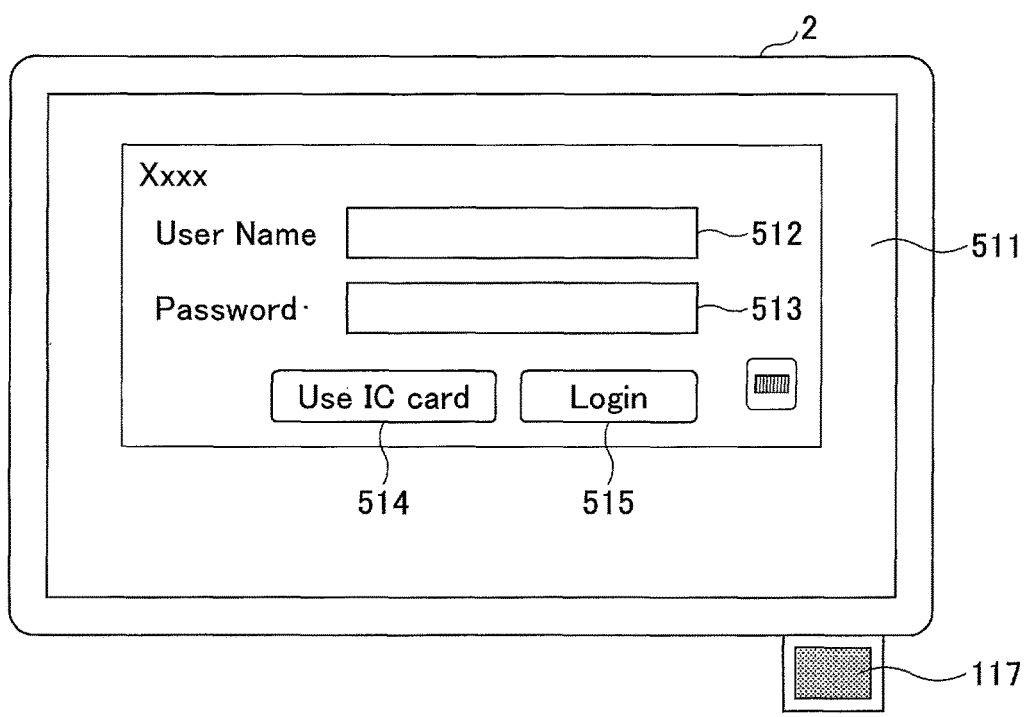

First, the user authentication will be described by using FIGS. 11A-11B. FIGS. 11A-11B illustrate examples of authentication screens displayed on the display 3. FIG. 11A illustrates a card authentication screen 501 for authentication by the IC card 130, and FIG. 11B illustrates a password authentication screen 511 for authentication by the password.

When the power of the electronic whiteboard 2 is turned on, the UI image generation unit 33 of the electronic whiteboard 2 displays the card authentication screen 501 in FIG. 11A. A message 502 "Please touch your IC card over the card reader" and a keyboard button 503 are displayed on the card authentication screen 501. Therefore, having read the message 502, the user can grasp that it is necessary to hold the IC card 130 over the RF tag reader 117.

If the user is not carrying the IC card 130, the user presses the keyboard button 503 by a pointing device such as a finger and the electronic pen 4. Then, the password authentication screen 511 of FIG. 11B is displayed. The password authentication screen 511 in FIG. 11B includes a user name field 512, a password field 513, an IC card button 514, and a login button 515. The user inputs the user name (or may be the user ID) into the user name field 512, and inputs the password into the password field 513. Then, when the login button 515 is pressed, the user ID and the password are transmitted to the account server 11. Also, when the IC card button 514 is pressed, the card authentication screen 501 in FIG. 11A is displayed.

Note that even if the user authentication can be done with either of the IC card 130 or the password as in FIGS. 11A and 11B, the user can set whether to be authenticated by using the IC card 130. In the following, authentication using the IC card 130 will be mainly described. However, even if the user is authenticated by the password, the user ID is identified. Therefore, the electronic whiteboard 2 can associate the page data with the user in either way.

<<Operations of Authentication>>

Figure 12:
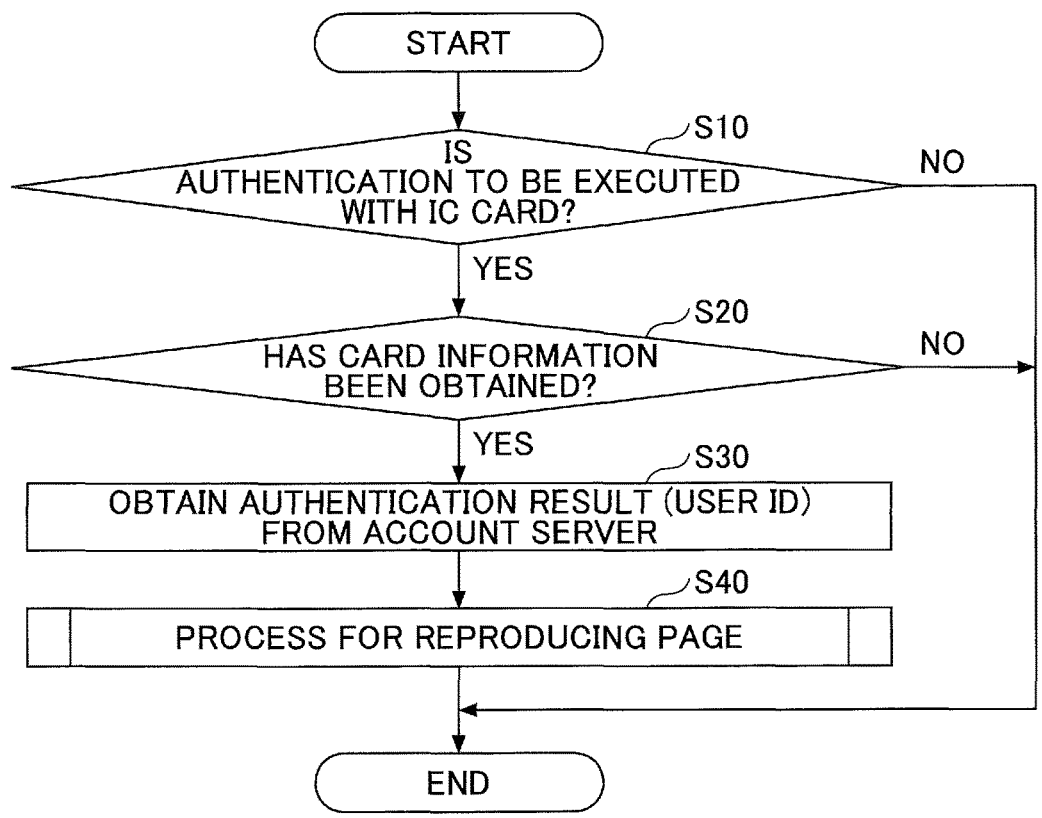
FIG. 12 is an example of a flowchart that illustrates steps for detecting an IC card, and authenticating a user by an electronic whiteboard.

FIG. 12 is an example of a flowchart that illustrates steps for the electronic whiteboard 2 to detect the IC card 130, and to authenticate the user. A process of FIG. 12 starts, for example, when the power of the electronic whiteboard 2 is turned on.

First, the card information read unit 62 of the electronic whiteboard 2 determines whether it is set to authenticate using the IC card 130 (Step S10). The card information read unit 62 reads setting information from the setting file storage unit 430 in which settings of the user are stored, for the determination. Even if it has been determined NO at Step S10, the user can be authenticated on the password authentication screen 511.

If it has been determined YES at Step S10, the UI image generation unit 33 of the electronic whiteboard 2 displays the card authentication screen 501 in FIG. 11A, and the card information read unit 62 determines whether the RF tag reader 117 has detected the IC card 130 and obtained the card information (Step S20).

If it has been determined YES at Step S20, the user ID obtainment unit 63 transmits the card information to the account server 11, to obtain an authentication result (Step S30). The authentication result is either "authentication OK" representing that the authentication has succeeded (in this case, the user ID is indicated), or "authentication NG" representing that the authentication has failed. In this way, the electronic whiteboard 2 can obtain the user ID, and can identify the user.

This process is also advantageous for the user because the user just needs to hold the IC card 130 over the RF tag reader 117, which makes the login operation easy.

After that, the electronic whiteboard 2 executes a page reproduction process (Step S40), which will be described in detail with FIG. 14.

<<Operations of Logout>>

Figure 13:
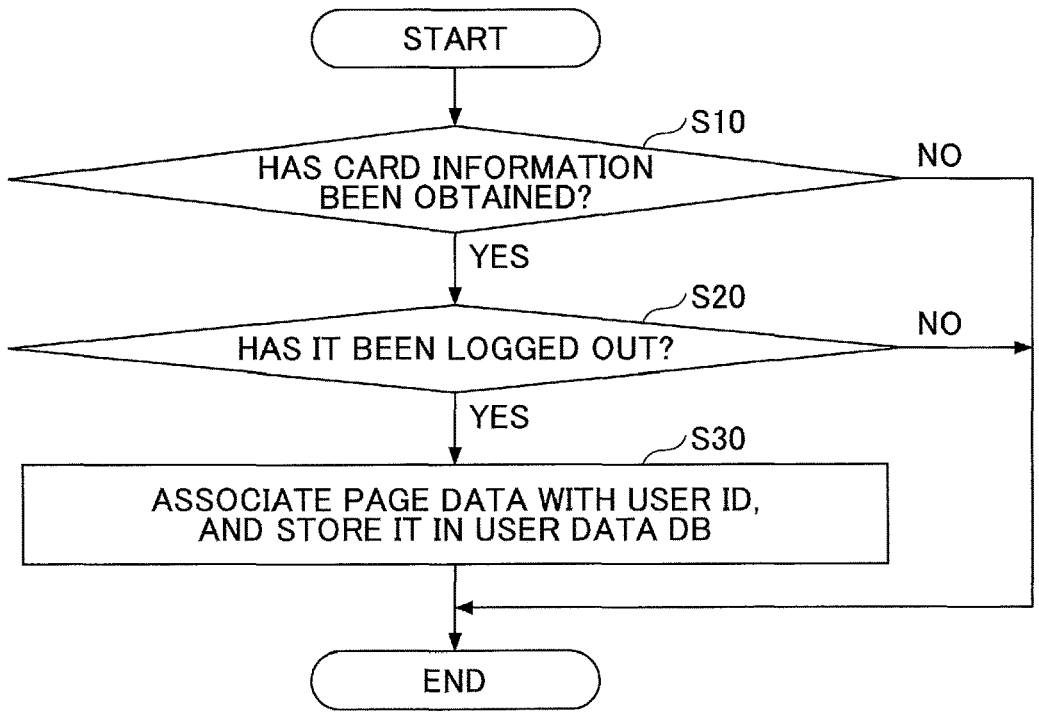
FIG. 13 is an example of a flowchart that illustrates steps for a user to log out.

FIG. 13 is an example of a flowchart that illustrates steps for the user to log out. A process of FIG. 13 is repeatedly executed, for example, while the power of the electronic whiteboard 2 is turned on.

The card information read unit 62 of the electronic whiteboard 2 determines whether the RF tag reader 117 has detected the IC card 130, and obtained the card information (Step S10). In other word, the user can perform a logout operation by holding the IC card 130 over the RF tag reader 117.

If it has been determined YES at Step S10, the operation reception unit 64 of the electronic whiteboard 2 determines whether the user has performed a confirming operation for the logout (Step S20). Since the user may have erroneously held the IC card 130 over the RF tag reader 117, the UI image generation unit 33 displays a query screen for confirming the logout, on the display 3. The operation reception unit 64 obtains a user operation responding to this query.

If it has been determined YES at Step S20, the data storage unit 65 of the electronic whiteboard 2 associates the page data stored in the page data storage unit 300, with the user ID, and stores the associated data in the user data DB 1001 (Step S30). Thus, the user executing a logout operation can store the page data including a stroke image handwritten on the display 3, as a PDF file or the like. The data storage unit 65 may encrypt the page data by the user ID.

Also, since the user can log out just by holding the IC card 130, it is an advantage that forgetting the logout can be prevented. Also, the logout makes the page data stored automatically.

Note that timing of storing the page data in the user data DB 1001 is not limited to the moment of a logout. For example, the page data may be stored upon a user operation, may be stored every time a new page is generated, or may be stored periodically.

<<Page Reproduction Process>>

Figure 14:
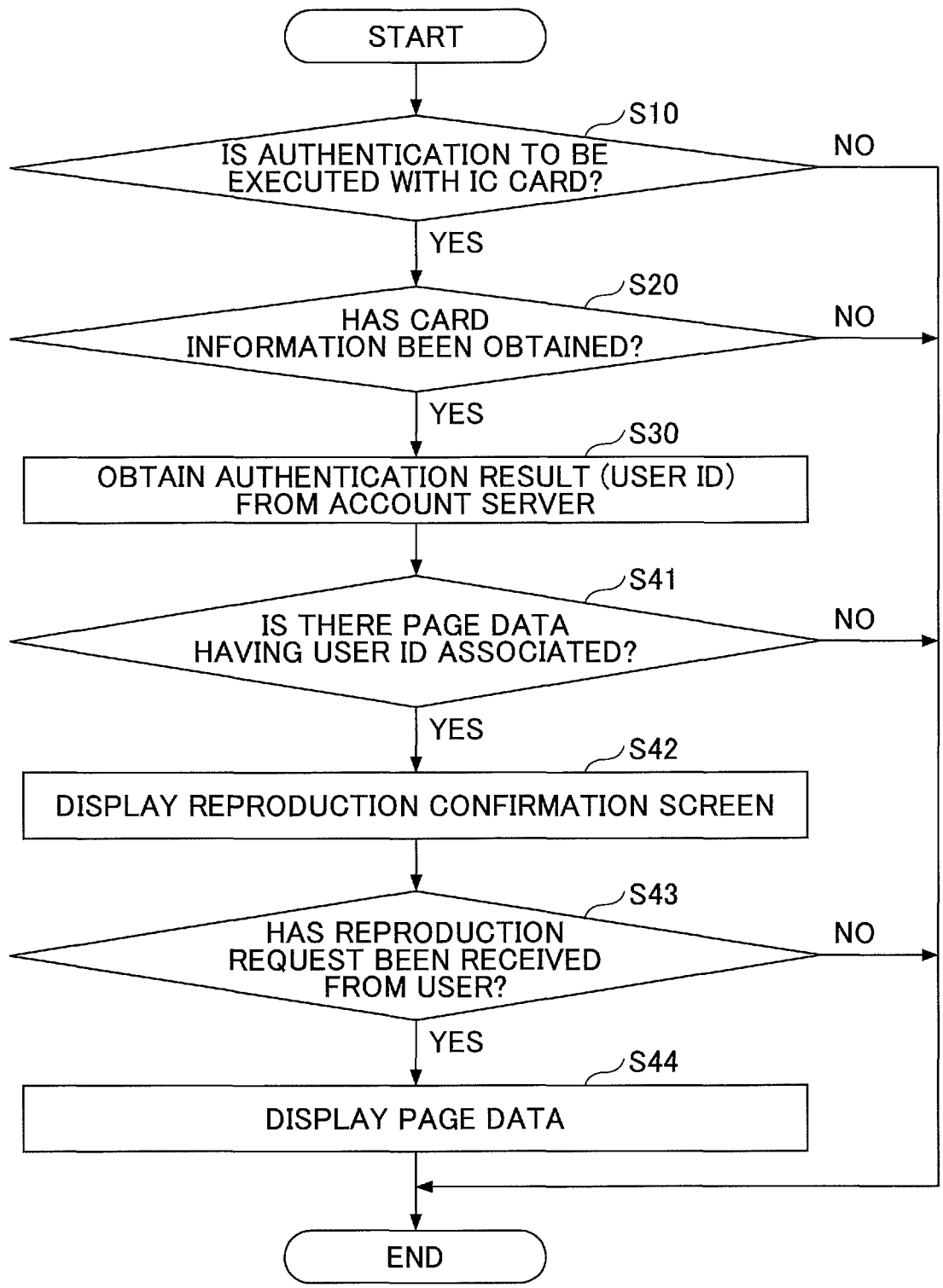
FIG. 14 is an example of a flowchart that illustrates steps for reproducing page data by an electronic whiteboard after having authenticated a user.
Figure 15:
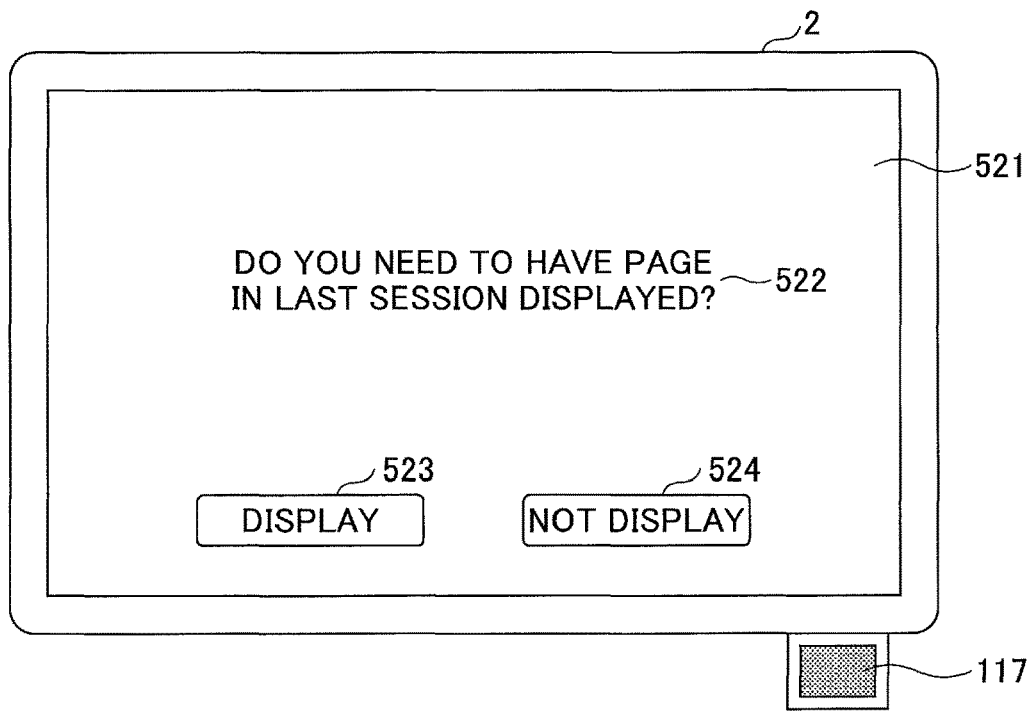
FIG. 15 is a diagram illustrating an example of a reproduction confirmation screen displayed on a display.

FIG. 14 is an example of a flowchart that illustrates steps for reproducing page data by the electronic whiteboard 2 after having authenticated a user. Since Steps S10 to S30 in FIG. 14 are the same as the steps in FIG. 12, Steps S41 to S44, which correspond to Step S40 in FIG. 12, will be described as a data reproduction process. Also, FIG. 15 will be referred to when appropriate. FIG. 15 illustrates an example of a reproduction confirmation screen 521 displayed on the display 3.

Having obtained the user ID from the account server 11, the data reproduction unit 66 determines whether, there is page data associated with the user ID (Step S41). This determination can be done whether page data associated with the user ID is registered in the user data DB 1001.

If it has been determined YES at Step S41, the data reproduction unit 66 of the electronic whiteboard 2 displays the reproduction confirmation screen 521 on the display (Step S42). The reproduction confirmation screen 521 is illustrated in FIG. 15. The reproduction confirmation screen 521 is a screen for confirming to the user whether reproduction of the page data (redisplaying the data) is to be executed. The reproduction confirmation screen 521 includes a message 522 "Do you need to have the page in the last session displayed?", a "display" button 523, and a "not display" button 524. Therefore, the user can select whether to redisplay the previous page data just by performing a login operation. The user can select whether to resume the previous page data, or to start handwriting a stroke image to generate new page data.

Referring back to FIG. 14, the description will continue. The data reproduction unit 66 determines whether reproduction has been requested by the user (Step S43). Specifically, the data reproduction unit 66 determines whether the operation reception unit 64 has received a press on the button 523 displayed on the reproduction confirmation screen 521.

If it has been determined YES at Step S43, the data reproduction unit 66 reads the page data associated with the user ID from the user data DB 1001, and displays the data on the display 3 (Step S44). If it has been determined NO at Step S43, the data reproduction unit 66 does not display the page data on the display 3. In this case, a blank screen is displayed on the display 3.

In this way, by authenticating the user and utilizing the authentication result, the user can display page data generated during the previous login session, for the next login session of the user. With the page data generated in the previous session, the user can easily resume work that has been suspended. Specifically, stroke data classified by the event classification unit 25 based on coordinates detected by the coordinate detection unit 22, for the stroke processing unit 32 as described above, is displayed superimposed with the page data. Also, since the PDF file is displayed as image data, the stroke processing unit 32 and the operation processing unit 26 can receive deletion and correction of strokes by the user. In this way, editing can be done again.

In this regard, the embodiment is compared with an image forming apparatus used by unspecified people. Although such an image forming apparatus may authenticate a user, it is not a usual use form in that image data used (for example, scanned) in a previous session is displayed on the image forming apparatus for the next session when the user is authenticated to use the image forming apparatus. Even if the previous data can be displayed, the image forming apparatus does not assume that the user resumes the suspended work.

Also, as in so-called "pull printing", it has been known that a user can register print data along with the user ID on a print server from a PC or the like, and later logs in the image forming apparatus to obtain the print data from the print server. However, even in the pull printing, the image forming apparatus does not authenticate the user when the data is registered. Even if the image forming apparatus authenticates the user, and associates the user with the print data, one can hardly assume that the user resumes suspended work on the image forming apparatus. Therefore, it is difficult to conceive of control of the electronic whiteboard 2 in the embodiment, based on the image forming apparatus.

Note that there may be a case where multiple page data items are associated with a single user ID. In this case, only the final page data item may be reproduced, or a list of data items may be displayed to receive selection of the user. If the user resumes the work, it may be often the case that the final page data item needs to be reproduced. On the other hand, by having the electronic whiteboard 2 display the list of page data items, the user can select a desired page data item even when multiple conferences are held in parallel.

<Case where Single Page Data is Associated with Multiple Users>

Since the electronic whiteboard 2 is used by a number of users, there may be a case where multiple users want to use single page data. For example, assume that a user A has been authenticated at a first conference, and the page data has been associated with the user ID of the user A. However, if the user A is not able to attend a second conference, participants in the second conference cannot reproduce the page data. To cope with such cases, the electronic whiteboard 2 can associate multiple user IDs of respective users with page data.

Figure 16:
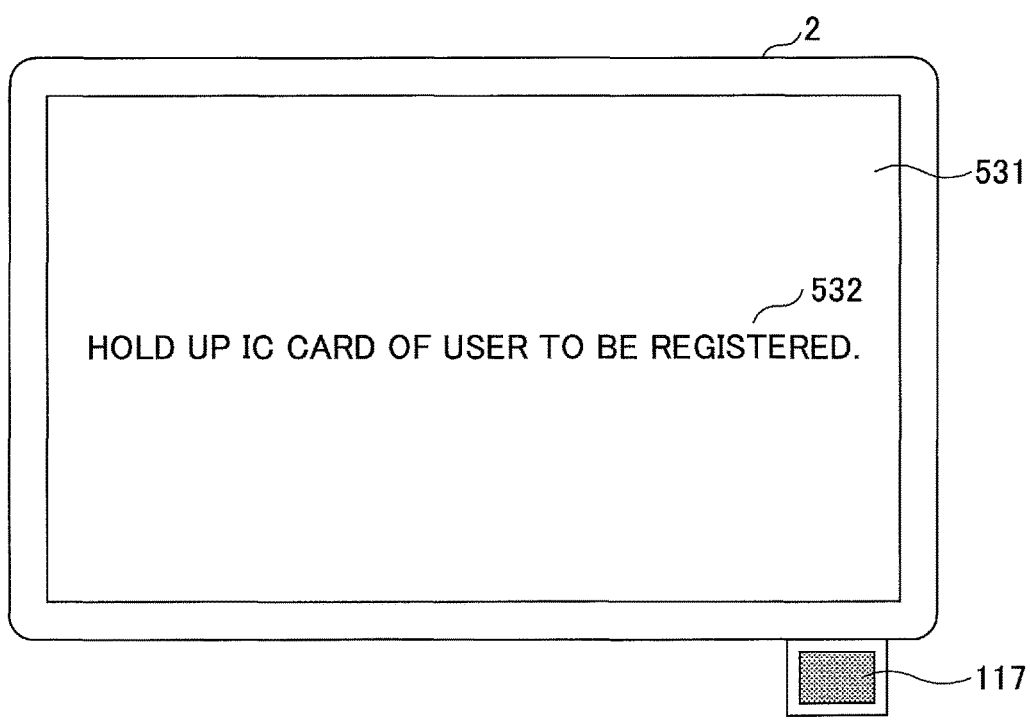
FIG. 16 is a diagram illustrating an example of a user ID registration screen displayed on a display.

As illustrated in FIG. 16, when associating multiple user IDs with page data, a user performs a predetermined operation to have a user ID registration screen 531 displayed on the display 3. FIG. 16 is a diagram illustrating an example of the user ID registration screen 531 displayed on the display 3. The user ID registration screen 531 includes a message 532 "Hold up the IC card of the user to be registered".

Assume that the user A is the user authenticated upon the activation, and a user B is a user to be additionally authenticated. Having seen this message 532, the user B can hold up the IC card 130. The user B is also authenticated by the account server 11, and the electronic whiteboard 2 obtains the user ID of the user B. Then, when the user A logs out, for example, the data storage unit 65 associates the user IDs of the user A and the user B with the page data, and stores the associated data in the user data DB 1001.

TABLE 11

| USER ID | FILE NAME |
|---------|-----------|
| 001     | nama1_01.pdf |
| 004     |           |
| 002     | nama2_01.pdf |
| 003     | nama3_01.pdf |
| ⋮       | ⋮         |

Table 11 illustrates another example of the user data table held in the user data DB 1001. Two user IDs "001" and "004" are associated with a single page data item. If having obtained one of the user IDs "001" and "004" upon a login, for example, the electronic whiteboard 2 reproduces the page data. The process for the data reproduction may be the same as in FIG. 14.

In this way, when multiple users use the electronic whiteboard 2, even if an authenticated participant in a previous session is absent, a participant in the next conference may have the page data displayed on the display 3.

Next, an application example will be described in that the electronic whiteboard 2 transmits page data associated with a user by an e-mail.

The electronic whiteboard 2 includes a mail sending function, and can transmit an e-mail to a transmission destination specified by a user. Also, the e-mail to be transmitted may have page data attached. For example, a user may transmit page data used in a conference to a mail address of the user (the user having been authenticated) as minutes or the like, or may transmit the data to participants of the conference.

To transmit an e-mail by the electronic whiteboard 2, the mail address of the transmission source of an e-mail is set to the mail address of the electronic whiteboard 2. Therefore, a recipient who received the e-mail can determine that it is an e-mail from the electronic whiteboard 2, but may not be able to determine a specific person who has transmitted the e-mail. Therefore, it is inconvenient for the recipient who received the e-mail to identify the user who has transmitted the e-mail, and to identify a person to talk to about the page data attached to the e-mail.

To solve such inconvenience, the mail sender (the user having been authenticated) may make a telephone call to a participant or the like to indicate that the e-mail about the conference has been transmitted. However, even in this case, the recipient of the e-mail needs to remember the actual person who has sent the e-mail, and correspondence between the e-mail and the date and time when the conference was held, which is inconvenient.

Thereupon, the application example will be described in that the electronic whiteboard 2 uses the association between the user ID and the page data, to replace the mail address of the transmission source of an e-mail with a mail address associated with the user ID obtained by authentication.

<Settings of E-Mail on Electronic Whiteboard 2>

Figure 17:
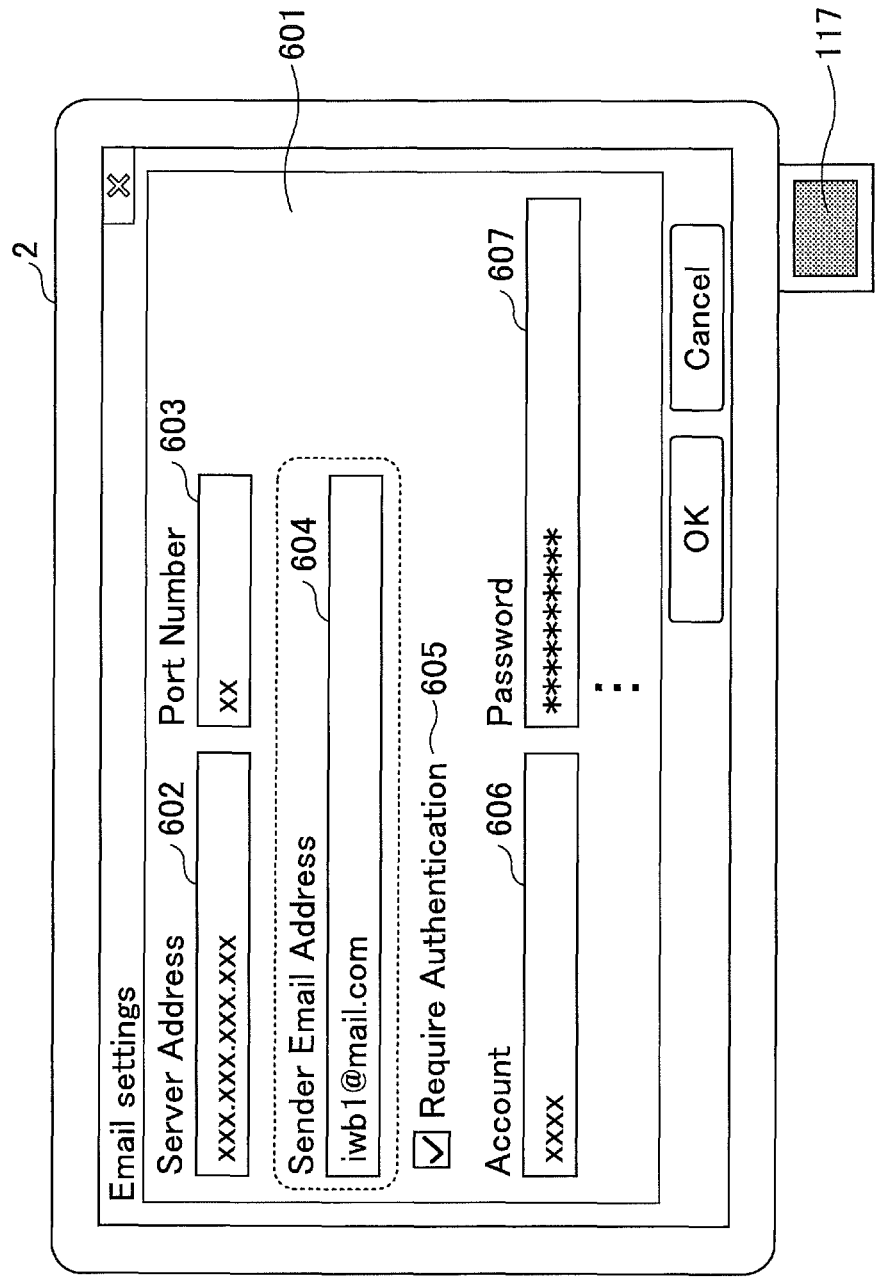
FIG. 17 is a diagram illustrating an example of an e-mail setting screen displayed on a display.

First, settings of an e-mail on the electronic whiteboard 2 will be described by using FIG. 17. FIG. 17 is a diagram illustrating an example of an email setting screen 601 displayed on the display 3. The email setting screen 601 in FIG. 17 is set appropriately by an administrator of the electronic whiteboard 2.

The email setting screen 601 includes a server address field 602, a port number field 603, a sender email address field 604, an authentication request field 605 (a check box with a message "Require Authentication"), an account field 606, and a password field 607. The server address field 602 is a field for inputting the IP address of the mail server 13, and the port number field 603 is a field for inputting a port number that is open to receiving an e-mail on the mail server 13. The sender email address field 604 is set to the mail address of the electronic whiteboard 2. For example, assume that "iwb1@mail.com" has been set. Therefore, with this setting, when the electronic whiteboard 2 transmits an e-mail, the mail address of the transmission source is set to "iwb1@mail.com".

The authentication request field 605 is a field for setting whether to make an authentication request to the mail server 13. The account field 606 and the password field 607 are provided for account information with which the mail server 13 authenticates the electronic whiteboard 2 by SMTP (Send Mail Transfer Protocol).

<Overview of Application Example>

Figure 18:
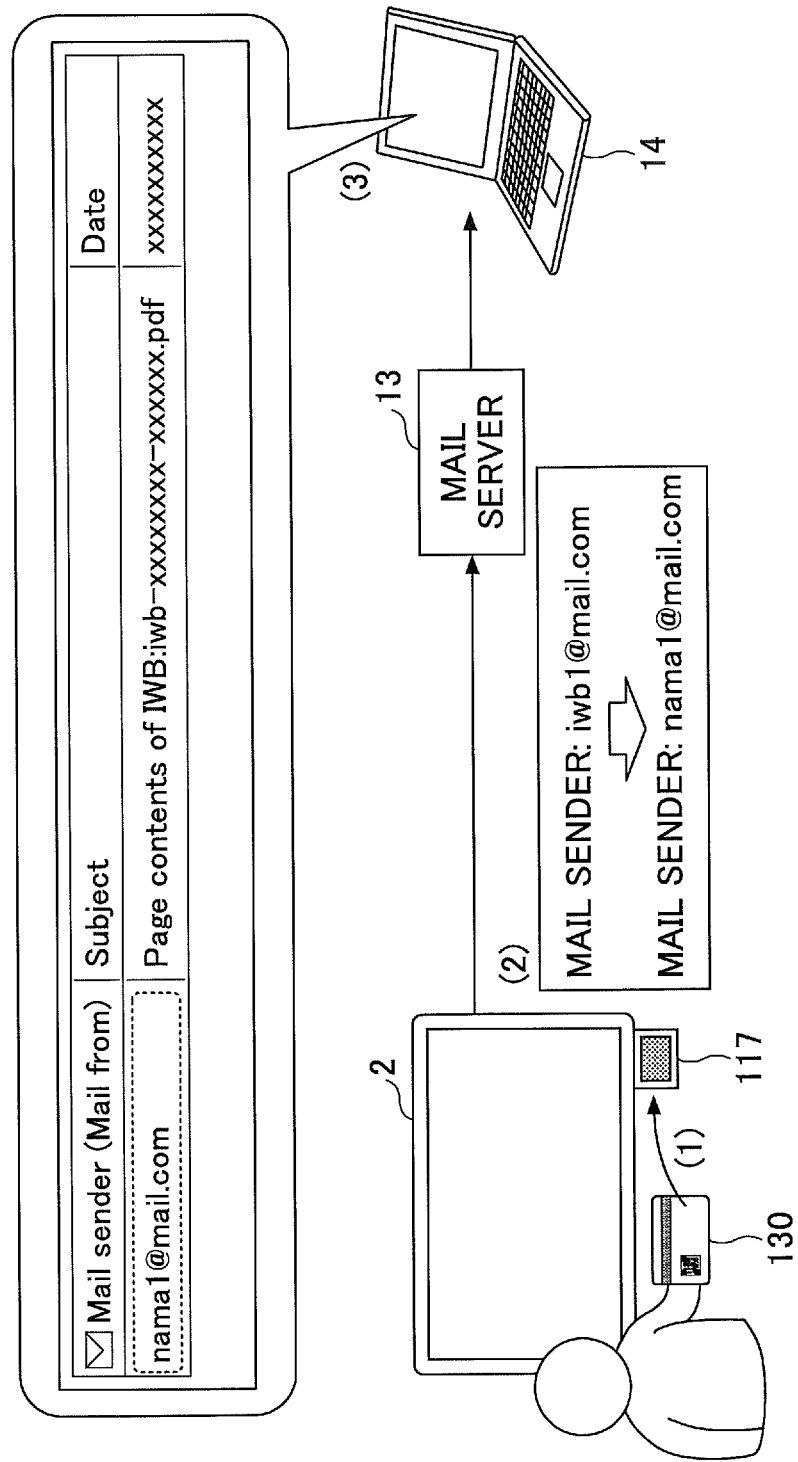
FIG. 18 is an example of a diagram illustrating an overview of operations by an electronic whiteboard when transmitting an e-mail.

FIG. 18 is an example of a diagram illustrating an overview of operations by the electronic whiteboard 2 when transmitting an e-mail.

(1) The user logs in the electronic whiteboard 2 by the IC card 130 or the like. Thus, the electronic whiteboard 2 can identify the user ID of the user, and can identify the mail address of this user associated with the user ID.

(2) When transmitting an e-mail, the electronic whiteboard 2 replaces the mail address of the electronic whiteboard 2 set as the transmission source, with the mail address of the user.

(3) When a user PC 14 receives the e-mail, the mail address of the user (nama1@mail.com) is displayed as the transmission source (in Mail Sender field).

Thus, the recipient can identify the sender of the e-mail, and hence, can easily determine who has transmitted the page data. Also, as for sending back a reply to the e-mail, no one may even receive or read the e-mail as long as the electronic whiteboard 2 is specified as the transmission source of the e-mail. In constant, in case that the user is specified as the transmission source, the recipient may attempt to send back a reply mail to the user. For example, if the recipient reviews the page data and needs to instruct correction or the like by a reply mail, there is an advantage that the destination does not need to be changed.

<About Functions>

<<Electronic Whiteboard>>

Figure 19:
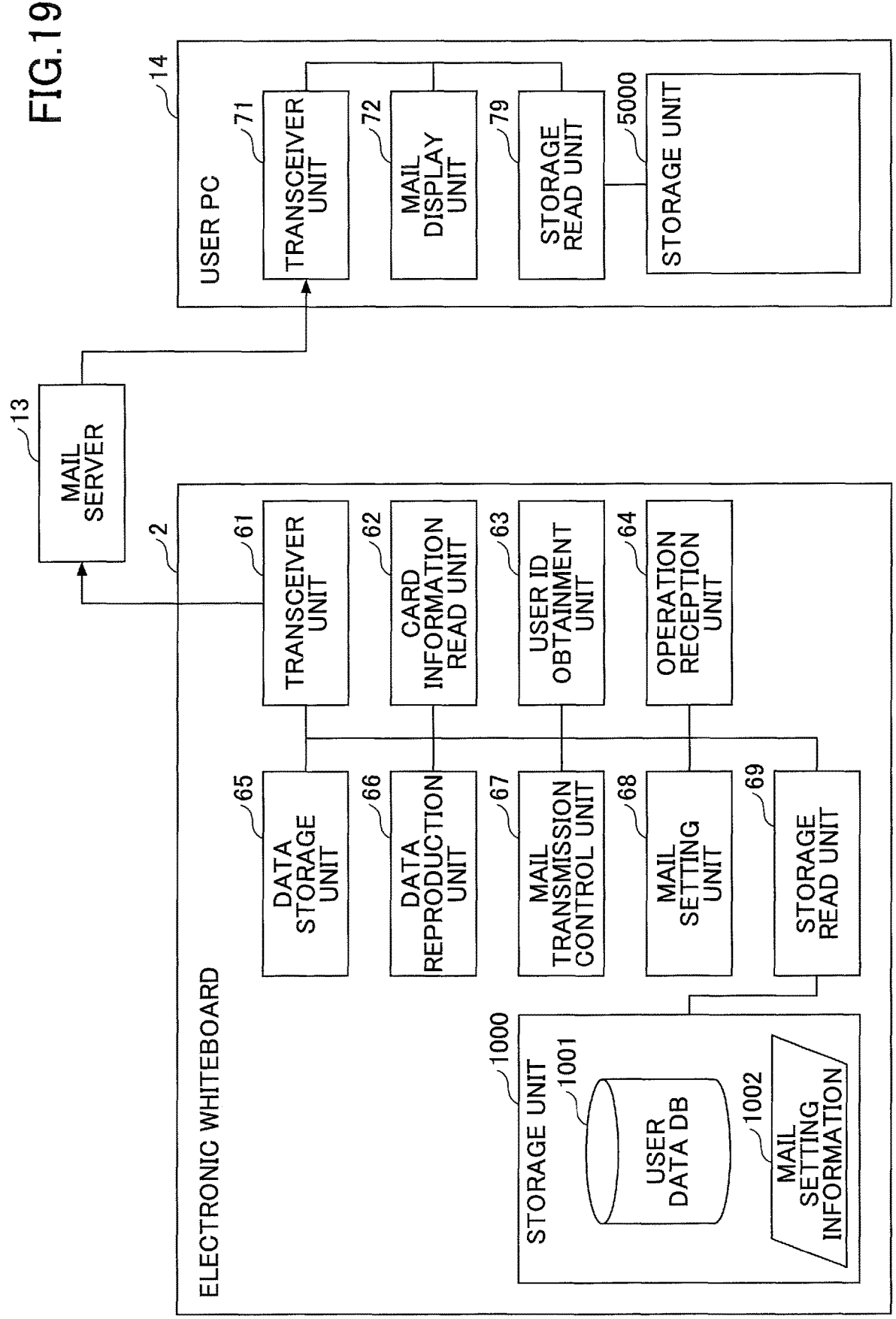
FIG. 19 is an example of a functional configuration diagram of an electronic whiteboard.

FIG. 19 is an example of a functional configuration diagram of the electronic whiteboard 2 according to the application example. Functions of the account server 11 may be the same as described above. The electronic whiteboard 2 in FIG. 19 includes a mail transmission control unit 67 and a mail setting unit 68 in addition to the functional units in FIG. 10. The elements in FIG. 19 having the same reference symbols as in FIG. 10 have the same functions, and only main elements in the application example may be described below.

The mail transmission control unit 67 and the mail setting unit 68 are functional units implemented or provided by one or more of the elements illustrated in FIG. 3, operating under instructions from the CPU 101 following a program loaded into the RAM 103 from the SSD 104.

Also, the storage unit 1000 stores a mail setting information 1002. The mail setting information 1002 stores information set on the email setting screen 601 including the mail address of the electronic whiteboard 2 as described with FIG. 16.

The mail transmission control unit 67 is implemented by the CPU 101 and the like illustrated in FIG. 3, to control transmitting an e-mail. Specifically, the mail transmission control unit 67 transmits an e-mail to the account server 11 following SMTP and specified destination, transmission source, subject, body, and page data to be attached.

The mail setting unit 68 is implemented by the CPU 101 and the like illustrated in FIG. 3, to replace the mail address of transmission source with the mail address of a user, or alternatively, to set the mail address of the user as the transmission source.

<<User PC>>

The hardware configuration of the user PC 14 may be the same as in FIG. 9. The user PC 14 includes a transceiver unit 71, a mail display unit 72, and a storage read unit 79. These units included in the user PC 14 are functional units implemented or provided by one or more of the elements illustrated in FIG. 9, operating under instructions from the CPU 201 following a program loaded into the RAM 203 from the auxiliary storage unit 204.

The user PC 14 also includes a storage unit 5000 constituted with one of the ROM 202, the RAM 203, and the auxiliary storage unit 204 illustrated in FIG. 9. The storage unit 5000 stores e-mails received by the user PC 14, and the like.

The transceiver unit 71 of the user PC 14 is implemented by the CPU 201, the communication unit 207, and the like illustrated in FIG. 9, to transmit and receive various data items with the electronic whiteboard 2 and the like. Note that in the following, description about "via the transceiver unit 71" may be omitted even when the user PC 14 transmits and receives data.

The mail display unit 72 is implemented by the CPU 201, the display control unit 206, and the like illustrated in FIG. 9, to receive an e-mail transmitted from the electronic whiteboard 2 by a protocol such as POP3 and IMAP, and to display the e-mail on the display 210.

The storage read unit 79 is implemented by the CPU 201 and the like illustrated in FIG. 9, to read out various data items stored in the storage unit 5000, and to write various data items in the storage unit 5000. Note that in the following, description about "via the storage read unit 79" may be omitted even when the storage read unit 79 executes a read or a write on the storage unit 5000.

<Transmission of E-Mail>

Figure 20:
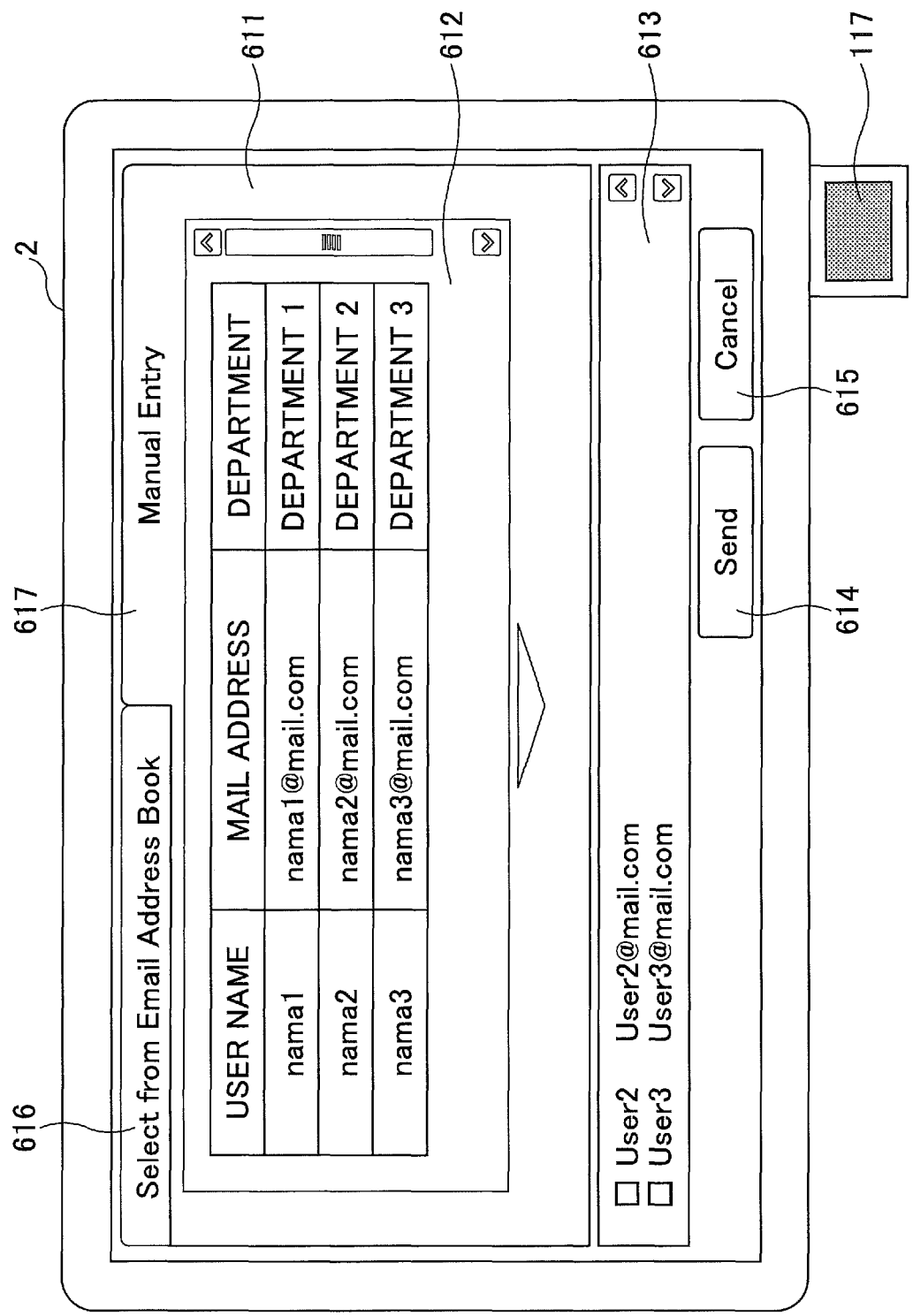
FIG. 20 is a diagram illustrating an example of a transmission screen of an e-mail.

FIG. 20 is a diagram illustrating an example of a transmission screen 611 of an e-mail. For example, in response to an operation for transmitting an e-mail by the user, the operation reception unit 64 receives the content of the operation, and the UI image generation unit 33 displays the transmission screen 611. The transmission screen 611 includes an address book display field 612, a selection display field 613, a transmission button 614, and a cancel button 615.

User names, mail addresses, departments, and the like registered in the address book of a login user are displayed on the address book display field 612. Since the login user ID has been identified, relevant information can be displayed as long as the information is registered in the address book management table 410 in Table 6. The user can select a transmission destination of the e-mail on the address book display field 612 by a pointing device such as a finger or the electronic pen 4.

User names and mail addresses of respective users selected by the user are displayed on the selection display field 613. The UI image generation unit 33 displays user names and mail addresses selected by the user on the address book display field 612 on the selection display field 613. The transmission button 614 is a button for receiving acceptance of transmission of the e-mail to the transmission destinations having been set.

Note that other than selecting the transmission destinations on the address book display field 612, the user can input a mail address of a transmission destination manually as illustrated in FIG. 20. In this case, the user switches to a tab 617 from a tab 616 to input a mail address manually.

<Operational Steps for Transmitting Mail>

Figure 21:
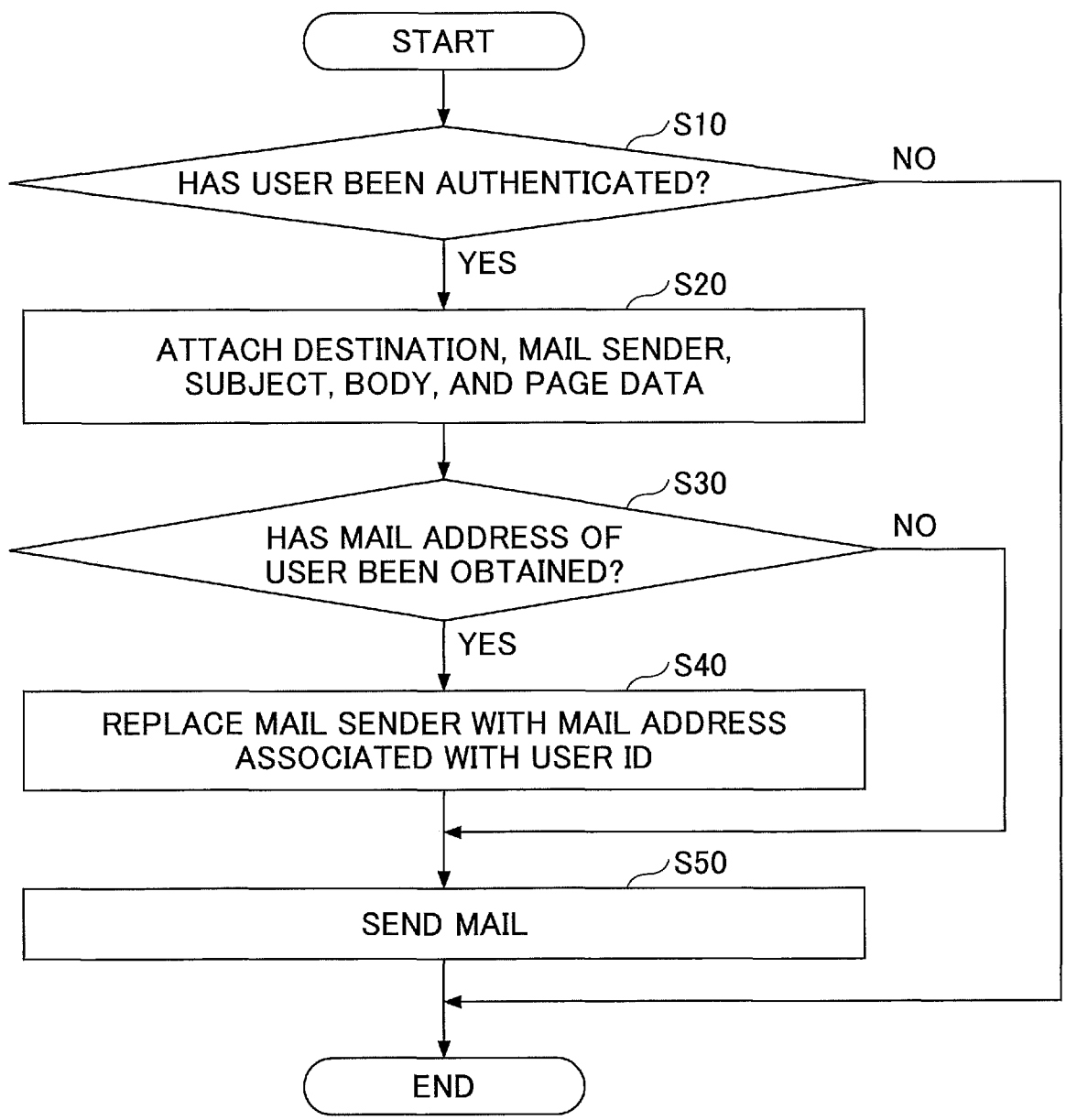
FIG. 21 is an example of a flowchart that illustrates steps for replacing the mail address of a transmission source of an e-mail by an electronic whiteboard.

FIG. 21 is an example of a flowchart that illustrates steps for replacing the mail address of a transmission source of an e-mail by the electronic whiteboard 2. A process of FIG. 21 starts, for example, when the transmission button 614 in FIG. 20 is pressed.

First, the mail transmission control unit 67 determines whether the user has been authenticated (Step S10). This is because if the user has not been authenticated, the user ID has not been obtained, and hence, the mail address and the page data of the user cannot be identified.

The mail transmission control unit 67 of the electronic whiteboard 2 sets the destination, transmission source, subject, body, and page data to be attached to the e-mail (Step S20). The destination is set to the mail address selected or input manually by the user as illustrated in FIG. 20. The transmission source is set to the mail address of the electronic whiteboard 2 stored in the mail setting information 1002. The subject is set to a typical phrase and the filename of the page data. The typical phrase is, for example, "Page contents of IWB:", indicating that this is an e-mail from the electronic whiteboard 2. The filename set as the filename of the page data may be one of the following two cases. One case is that the user data DB 1001 has not been stored in the page data as the user has not logged out yet. In this case, the page data stored in the page data storage unit 300 is converted into a PDF file, the date and time are assigned as the filename, and this filename is set as the filename of the page data. The other case is that the user transmits page data that has already stored in the user data DB 1001. In this case, the filename of the PDF file stored in the user data DB 1001 (in case of multiple files, the last PDF file or a PDF file selected by the user) is set as the filename of the page data.

The body is not set specifically. The page data to be attached is set similar to the filename of the page data, which is one of the data stored in the page data storage unit 300, and the data stored in the user data DB 1001.

Next, the mail transmission control unit 67 determines whether the mail address of the user has been obtained (Step S30). This is because there may be a user whose mail address has not been registered, although e-mail addresses of users associated with respective user IDs are usually managed in the address book management table 410. If it has been determined NO at Step S30, the transmission source remains set to the mail address of the electronic whiteboard 2.

If it has been determined YES at Step S30, the mail setting unit 68 of the electronic whiteboard 2 replaces the transmission source set at Step 20, with the mail address associated with the user ID of the login user in the address book management table 410 in Table 6 (Step S40).

Then, the mail transmission control unit 67 of the electronic whiteboard 2 transmits the e-mail to the mail server 13 (Step S50).

FIG. 22A is an example of a diagram illustrating a transmission source of an e-mail displayed on the user PC 14 of a recipient of the e-mail. Upon receiving an e-mail, the mail display unit 72 displays fields of Mail Sender, Subject, and Date, and respective contents as illustrated. Note that the body is omitted here. It can be seen that the mail address of the user (nama1@mail.com) is displayed in the field for transmission source (Mail Sender). Replacing the mail address of the transmission source in this way makes it possible for the recipient to identify the user who has transmitted the e-mail. The recipient can transmit an e-mail to the authenticated user (a person who has transmitted the e-mail) just by performing a reply operation.

FIG. 22B is an example of a comparative diagram illustrating a transmission source of an e-mail displayed on the user PC 14 of a recipient of the e-mail. It can be seen that the mail address of the electronic whiteboard 2 (iwb1@mail.com) is display in the field for transmission source (Mail Sender). The transmission source (Mail Sender) is displayed as in FIG. 22B in cases such that the electronic whiteboard 2 has transmitted the e-mail conventionally; the user has not been authenticated; and the mail address of the user has not been obtained by the process of FIG. 21.

In this regard, the embodiment is compared with an image forming apparatus used by unspecified people. Such an image forming apparatus may have a known function called "Scan To E-mail", by which the image forming apparatus can transmit scanned image data to an arbitrary user. However, even if the image forming apparatus transmits a document as a material to planned participants before a conference, the recipients hardly need to transmit this image data to the user being the sender. Also, the user does not usually transmit the document as the material to the planned participants after the conference. Therefore, it makes sense that the electronic whiteboard 2 transmits data generated in a conference to participants and the like, and it is difficult to conceive of control of replacing the mail address in the application example, based on a "Scan To E-mail" function of a conventional image forming apparatus.

Modified Example 1

It has been already described that when a user transmits page data to a destination other than himself/herself, the mail address of the user is preferably set as the transmission source, rather than the mail address of the electronic whiteboard 2. However, when a user transmits page data to himself/herself as the destination, there may be a case where the mail address of the electronic whiteboard 2 is preferably set as the transmission source. First, since the user has transmitted the e-mail by himself/herself, the user can grasp that even if the transmission source is set to the electronic whiteboard 2, the page data has been transmitted by himself/herself based on the received date and time and the like. Also, since the page data generated by the electronic whiteboard 2 is a PDF file, the page data can be reproduced on any user PC 14 or electronic whiteboard 2. However, for the user to edit the page data, the page data is preferably displayed on the electronic whiteboard 2 on which the page data has been generated. This is due to a function of the electronic whiteboard 2 to accept a request for editing a PDF file which has been generated on the same electronic whiteboard 2, but not to accept a request for editing a PDF file if generated on another electronic whiteboard 2. Such control is executed by collation of the device ID of the electronic whiteboard 2 describe in the PDF file.

Therefore, when a user transmits page data to himself/herself as the destination, the mail address of the electronic whiteboard 2 is preferably set as the transmission source to be able to identify the electronic whiteboard 2 as the transmission source.

First, by using FIG. 23, a transmission screen of an e-mail will be described that is used when a user transmits page data to himself/herself as a single destination.

Figure 23:
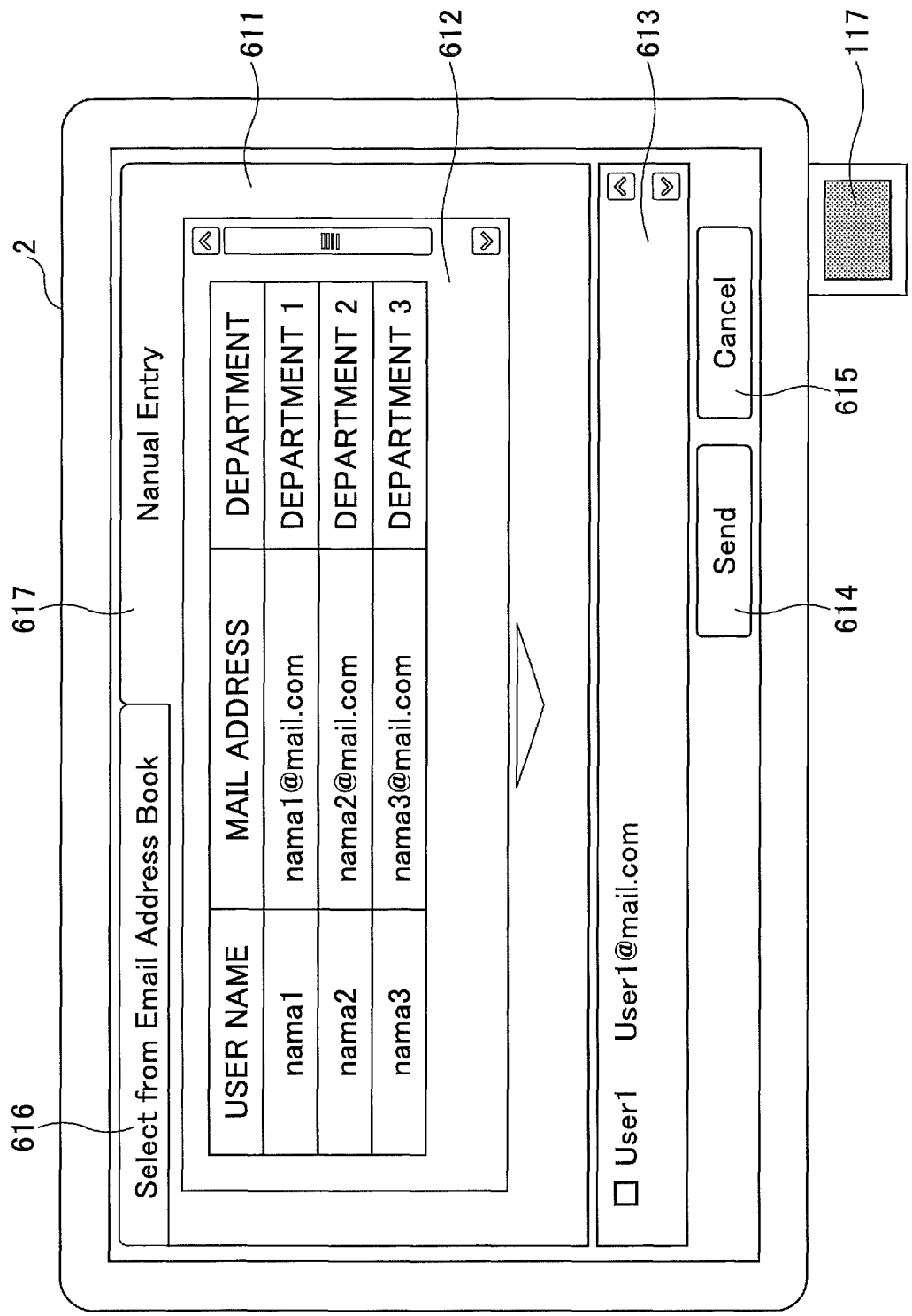
FIG. 23 is a diagram illustrating an example of a transmission screen of an e-mail.

FIG. 23 is a diagram illustrating an example of such a transmission screen of an e-mail. In description of FIG. 23, different points from FIG. 20 will be mainly described. It is assumed that a user 1 has been authenticated in FIG. 23. Different from FIG. 20, only the user 1 is displayed in the selection display field 613, to whom the mail is to be transmitted. As the user 1 is the only recipient, need is low for the user 1 as the recipient to recognize who has sent the mail. Also, described above, it is more desirable for the user 1, as the very person who transmits the page data, to be able to distinguish from which electronic whiteboard 2 the e-mail has been sent. Thereupon, the electronic whiteboard 2 operates as follows.

Figure 24:
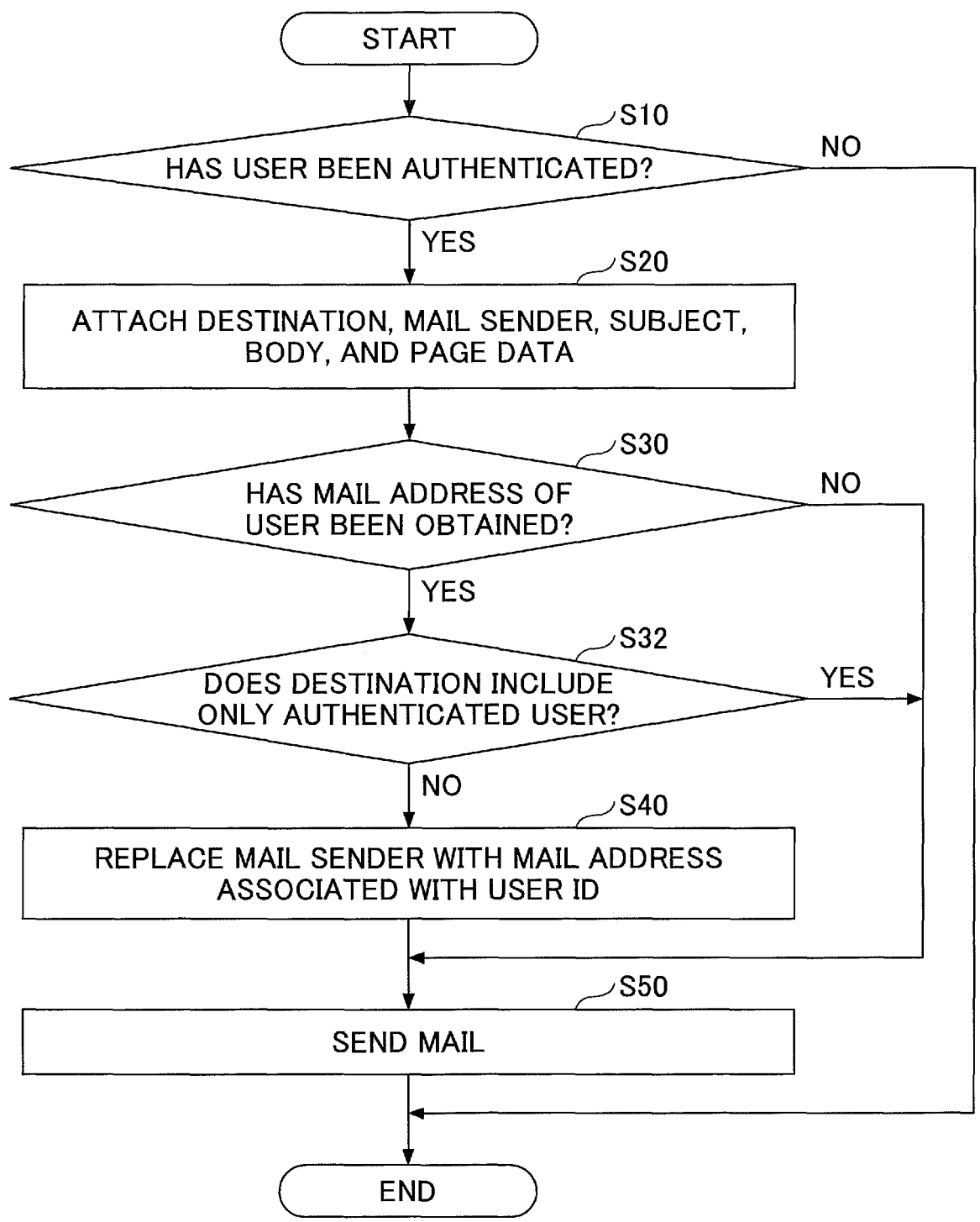
FIG. 24 is an example of a flowchart that illustrates steps for replacing the mail address of a transmission source of an e-mail by an electronic whiteboard (modified example 1)

FIG. 24 is an example of a flowchart that illustrates steps for replacing the mail address of a transmission source of an e-mail. In description of FIG. 24, different points from FIG. 21 will be mainly described.

Steps S10 to S30 are the same as in FIG. 21. If it is determined at Step S30 that the mail address has been obtained (YES at Step S30), the mail setting unit 68 of the electronic whiteboard 2 determines whether the destination includes only the authenticated user (Step S32). First, the mail setting unit 68 determines whether only one mail address is set as the destination. If only one mail address is set, since the user ID of the authenticated user has been obtained, the mail setting unit 68 obtains the mail address associated with this user ID from the address book management table 410. Then, the mail setting unit 68 determines whether the obtained mail address matches the destination mail address.

If it has been determined YES at Step S32, the process goes forward to Step S50, and hence, the transmission source is not replaced with the mail address of the user. If it has been determined NO at Step S32, the process goes forward to Step S40, and hence, the transmission source is replaced with the mail address of the user.

If the destination includes only the authenticated user, the mail address of the electronic whiteboard 2 is displayed as in FIG. 22B on the user PC 14 of the recipient who has received the e-mail, and hence, the user can determine on which electronic whiteboard 2 the user can edit the PDF file.

In this regard, the embodiment is compared with an image forming apparatus used by unspecified people. Since such an image forming apparatus does not have a phase of editing data, there is virtually no advantage to execute similar control on the image forming apparatus. In contrast, on the electronic whiteboard 2 in the embodiment, since a user can edit data again which has been once transmitted externally, control as in FIG. 24 is effective, and it is difficult to conceive of control of replacing the mail address in the embodiment, based on a "Scan To E-mail" function of a conventional image forming apparatus.

Modified Example 2

In the process of FIG. 21, the recipient cannot identify the user who has transmitted the page data if the mail address of the authenticated user is not registered in the address book management table 410. Thereupon, the user name may be set to the body or the subject as follows.

FIG. 25 is an example of a flowchart that illustrates steps for replacing the mail address of a transmission source of an e-mail. In description of FIG. 25, different points from FIG. 21 will be mainly described.

In the process of FIG. 25, if it has been determined at Step S30 that the mail address has not been obtained (NO at Step S30), the mail setting unit 68 of the electronic whiteboard 2 sets the user name to the body or the subject (Step S60). Since the user name has been identified by the account server 11, or the user has input the user name along with the password, the user name is known to the electronic whiteboard 2. Setting the user name to the body or the subject makes it advantageous for the recipient to easily identify the user who has transmitted the mail even if the electronic whiteboard 2 is set as the transmission source.

FIG. 27A is a diagram illustrating an e-mail having the user name set in the subject field. The recipient can grasp that it is an e-mail transmitted from the electronic whiteboard 2 because the transmission source is set to the mail address of the electronic whiteboard 2. Also, the user who has transmitted the e-mail can be also identified.

Modified Example 3

In the process of FIG. 21, since the transmission source is replaced by the mail address of the user, it is difficult for the recipient to identify the electronic whiteboard 2. However, as described above, the electronic whiteboard 2 being clarified as the transmission source makes it easy for the recipient to identify an electronic whiteboard 2 on which a PDF file can be edited. Thereupon, the mail address of the electronic whiteboard 2 may be set to the body or the subject as follows.

FIG. 26 is an example of a flowchart that illustrates steps for replacing the mail address of a transmission source of an e-mail. In description of FIG. 26, different points from FIG. 21 will be mainly described.

In the process of FIG. 26, Step S42 is added. The mail setting unit 68 of the electronic whiteboard 2 replaces the transmission source with the mail address of the user, and sets the mail address of the electronic whiteboard 2 to the body or the subject (Step S42).

FIG. 27B is a diagram illustrating an e-mail having the mail address of the electronic whiteboard 2 set to the subject. Therefore, the recipient can send a reply e-mail to the user, and having the mail address of the electronic whiteboard 2 set to the body or the subject, has an advantageous to be able to easily identify the electronic whiteboard 2 on which a PDF file can be edited.

Other Application Examples

As above, most preferable embodiments have been described. Note that the present invention is not limited to these embodiments, but various variations and modifications may be made without departing from the scope of the present invention.

For example, the electronic whiteboard 2 may have the functions of the account server 11. In this case, the account server 11 may be omitted.

Also, in the embodiments described above, although the mail address of the user is included in the address book management table 410, the mail address may be included in the IC card 130. Also, once the authentication has succeeded, the user may input the mail address manually.

Although the embodiments have been described with the term of "electronic whiteboard 2", the electronic whiteboard 2 may be called the electronic information board, the electronic blackboard, the interactive whiteboard, and the like.

Also, although the embodiments have been described with the electronic whiteboard 2 as an example, the embodiments may be applied to any other devices that are used by a large number of unspecified people to create data and to continuously use the data.

Also, the example configuration as illustrated in FIG. 10 or 19 includes functional units partitioned based on main functions, to make it easy to understand processes executed by the electronic whiteboard 2. Note that the present invention is not limited by such specific partitioning of functional units and their names. The processes by the electronic whiteboard 2 may be further partitioned into more functional units depending on contents of processing. Also, partitioning may be done such that each functional unit includes further more contents of processing.

Also, one or more storage units illustrated in the storage units 1000 and 3000 in FIGS. 10 and 19 may exist on a network.

Note that the user authentication unit 82 is an example of an authentication unit; the user ID obtainment unit 63 is an example of an identification information obtainment unit; the user data DB 1001 is an example of a visual information storage unit; the storage read unit 69 is an example of a read unit; the data reproduction unit 66 is an example of a display unit or a first display unit; the mail transmission control unit 67 is an example of an e-mail transmitter unit; the mail setting unit 68 is an example of a mail setting unit; and the operation reception unit 64 is an example of an edit reception unit. The address book management table 410 is an example of a mail address storage unit; and the mail display unit 72 is an example of a second display unit. The data storage unit 65 is an example of a storage unit; the transceiver unit 71 is an example of a receiver unit; the user PC 14 is an example of an information terminal; and the method for displaying the page data by the electronic whiteboard 2 described in the embodiments is an example of a method for displaying.

RELATED-ART DOCUMENTS

Patent Documents

[Patent Document 1] Japanese Unexamined Patent Application Publication No. 2013-150131

The present application claims priority under 35 U.S.C. § 119 of Japanese Patent Application No. 2015-248046 filed on Dec. 18, 2015, the entire contents of which are hereby incorporated by reference.

What is claimed is:

1. An electronic whiteboard configured to display a display image on a display, the electronic whiteboard comprising:
one or more hardware processors; and
one or more hardware memories containing programming that causes the one or more hardware processors to:
authenticate a user;
set a sender e-mail address field of an e-mail to an e-mail address held by the electronic whiteboard, and to transmit the display image to a destination specified by the user, by an e-mail; the sender e-mail address field indicating a transmission source of the email; and
in a case where authentication of the user has succeeded, set the sender e-mail address field of the e-mail with an e-mail address of the user based on user identification information for identifying the user;
wherein in a case where the e-mail address of the user associated with the user identification information does not exist, the one or more hardware processors sets a name of the user associated with the user identification information, to a body or a subject of the e-mail, without replacing the e-mail address of the electronic whiteboard in the sender e-mail address field of the e-mail with the stored e-mail address of the user.

2. The electronic whiteboard as claimed in claim 1, wherein the programming causes the one or more hardware processors to:
receive editing on the displayed display image.

3. The electronic whiteboard as claimed in claim 1, wherein the programming causes the one or more hardware processors to:
obtain the user identification information for identifying the user in the case where the authentication of the user has succeeded;
store the display image in association with a plurality of user identification information of a plurality of users;
read the display image, in the case where (i) the authentication of the user has succeeded, and (ii) the obtained user identification information is among the plurality of user identification information associated with the display image.

4. The electronic whiteboard as claimed in claim 1, wherein the programming causes the one or more hardware processors to communicate via an RF tag reader with an IC card carried by the user, to obtain the user identification information for identifying the user.

5. The electronic whiteboard as claimed in claim 4, wherein the programming causes the one or more hardware processors to:

in a case where the RF tag reader has detected the IC card in a state where authentication of the user has succeeded, and at a predetermined time before or upon a logout of the user, to associate the display image generated by the user with the obtained user identification information, and to store the associated visual information.

6. The electronic whiteboard as claimed in claim 1, wherein in a case where the destination only includes the e-mail address of the user associated with the obtained user identification information, the one or more hardware processors read an e-mail address associated with the obtained user identification information, or does not replace the transmission source with the e-mail address of the user input on the electronic whiteboard.

7. The electronic whiteboard as claimed in claim 1, wherein the programming causes the one or more hardware processors to:

determine whether the authentication of the user has succeeded or failed by using card information of an IC card carried by the user.

8. The electronic whiteboard as claimed in claim 7, wherein the card information includes at least a user ID and a password.

9. The electronic whiteboard as claimed in claim 8, wherein the user identification information includes at least the user ID and the password.

10. The electronic whiteboard as claimed in claim 1, wherein the one or more hardware processors sets the sender e-mail address field of the e-mail to an email address of the electronic whiteboard.

11. An electronic whiteboard configured to display a display image on a display, the electronic whiteboard comprising:

one or more hardware processors; and one or more hardware memories containing programming that causes the one or more hardware processors to:

authenticate a user;

set a sender e-mail address field of an e-mail to an e-mail address held by the electronic whiteboard, and to transmit the display image to a destination specified by the user, by an e-mail; the sender e-mail address field indicating a transmission source of the email; and in a case where authentication of the user has succeeded, set the sender e-mail address field of the e-mail with an e-mail address of the user based on user identification information for identifying the user;

wherein the one or more hardware processors replaces the e-mail address of the electronic whiteboard in the sender e-mail address field of the e-mail with the stored e-mail address of the user, and sets the e-mail address of the electronic whiteboard to a body or a subject of the e-mail.

12. An electronic whiteboard configured to display a display image on a display, the electronic whiteboard comprising:

one or more hardware processors; and one or more hardware memories containing programming that causes the one or more hardware processors to:

authenticate a user;

set a sender e-mail address field of an e-mail to an e-mail address held by the electronic whiteboard, and to transmit the display image to a destination specified by the user, by an e-mail; the sender e-mail address field indicating a transmission source of the email: and in a case where authentication of the user has succeeded, set the sender e-mail address field of the e-mail with an e-mail address of the user based on user identification information for identifying the user;

wherein in a case where the e-mail address of the user associated with the obtained user identification information has not been obtained, the one or more hardware processors sets a name of the user associated with the obtained user identification information, to a body or a subject of the e-mail.

* * * * *